(12) United States Patent
Park

(10) Patent No.: US 11,088,725 B2
(45) Date of Patent: *Aug. 10, 2021

(54) WIRELESS POWER TRANSFERRING METHOD AND DEVICE THEREFOR

(71) Applicant: LG Electronics Inc., Seoul (KR)

(72) Inventor: Yongcheol Park, Seoul (KR)

(73) Assignee: LG Electronics Inc., Seoul (KR)

( * ) Notice: Subject to any disclaimer, the term of this patent is extended or adjusted under 35 U.S.C. 154(b) by 69 days.

This patent is subject to a terminal disclaimer.

(21) Appl. No.: 16/696,420

(22) Filed: Nov. 26, 2019

(65) Prior Publication Data

US 2020/0099417 A1 Mar. 26, 2020

Related U.S. Application Data

(63) Continuation of application No. 16/315,894, filed as application No. PCT/KR2017/010050 on Sep. 13, 2017, now Pat. No. 10,530,426.

(Continued)

(51) Int. Cl.
*H04B 5/00* (2006.01)
*H02J 50/80* (2016.01)
(Continued)

(52) U.S. Cl.
CPC .............. *H04B 5/0037* (2013.01); *H02J 5/00* (2013.01); *H02J 7/02* (2013.01); *H02J 50/60* (2016.02); *H02J 50/80* (2016.02); *H04B 5/0031* (2013.01)

(58) Field of Classification Search
CPC ....... H04B 5/0037; H04B 5/0031; H02J 7/02; H02J 5/00; H02J 50/80; H02J 50/60; H02J 7/00034; H02J 50/12; H02J 50/10
See application file for complete search history.

(56) References Cited

U.S. PATENT DOCUMENTS

2010/0279606 A1* 11/2010 Hillan ................ H04B 5/00
455/41.1
2013/0002038 A1* 1/2013 Lee .................... H02J 50/12
307/104

(Continued)

FOREIGN PATENT DOCUMENTS

KR 101471806 12/2014
KR 20160011925 2/2016
(Continued)

*Primary Examiner* — Ankur Jain
(74) *Attorney, Agent, or Firm* — Fish & Richardson P.C.

(57) ABSTRACT

According to an embodiment of the present invention, a method for transferring wireless power by an electric power transmitter may comprise: a selection step of monitoring a placement or a removal of an object on or from an interface surface of the power transmitter; a ping step of performing a digital ping and receiving a response from a power receiver; an identifying/configuring step of receiving a configuration packet including configuration information of the power receiver; and a negotiating step of transmitting a capability packet including information on a level of power transferred by the power transmitter, wherein the capability packet may include an NFC detection field indicating whether the power transmitter has a capability of detecting an RFID and/or an NFC, and/or whether the RDID and/or the NFC is detected.

15 Claims, 20 Drawing Sheets

Related U.S. Application Data

(60) Provisional application No. 62/457,976, filed on Feb. 12, 2017, provisional application No. 62/447,923, filed on Jan. 19, 2017, provisional application No. 62/425,039, filed on Nov. 21, 2016, provisional application No. 62/400,640, filed on Sep. 28, 2016, provisional application No. 62/398,529, filed on Sep. 23, 2016.

(51) Int. Cl.
*H02J 50/60* (2016.01)
*H02J 7/02* (2016.01)
*H02J 5/00* (2016.01)

(56) References Cited

U.S. PATENT DOCUMENTS

| | | | | |
|---|---|---|---|---|
| 2014/0184150 A1* | 7/2014 | Walley | ................... | H02J 50/12 |
| | | | | 320/108 |
| 2014/0298447 A1* | 10/2014 | Chu | ................... | H04B 5/0037 |
| | | | | 726/18 |
| 2015/0380976 A1* | 12/2015 | Heo | ..................... | H02J 50/80 |
| | | | | 455/573 |

FOREIGN PATENT DOCUMENTS

| | | |
|---|---|---|
| KR | 20160012889 | 2/2016 |
| WO | WO2012135139 | 10/2012 |

\* cited by examiner

[FIG. 1]
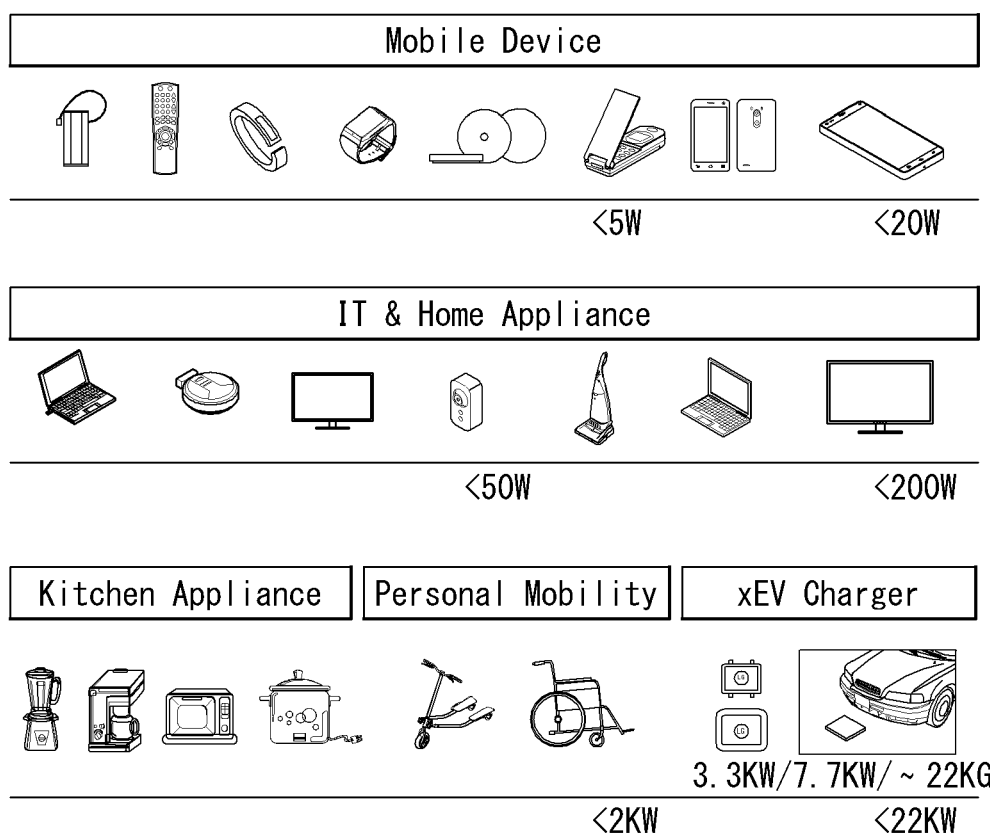

[FIG. 2]
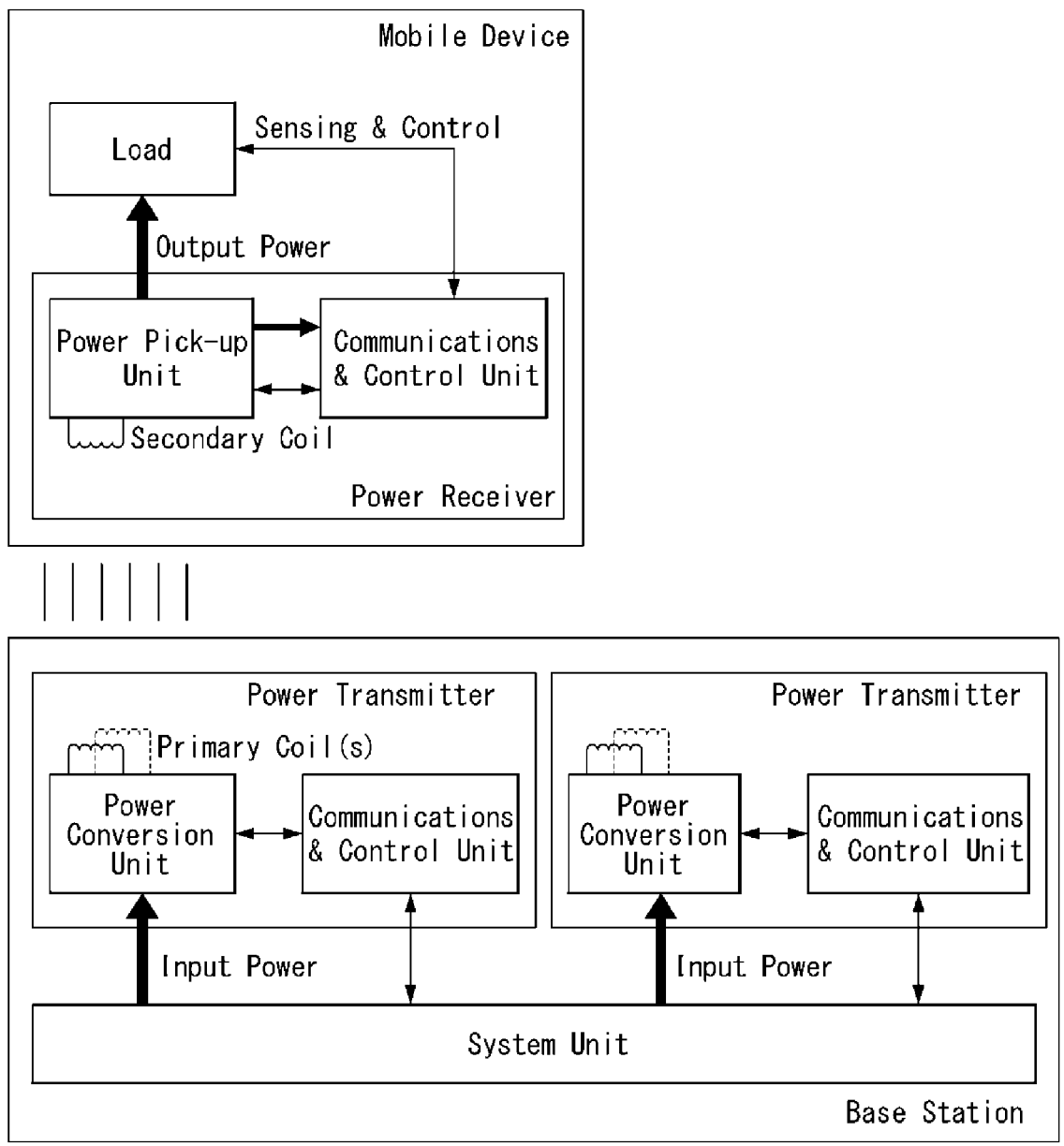

[FIG. 3]
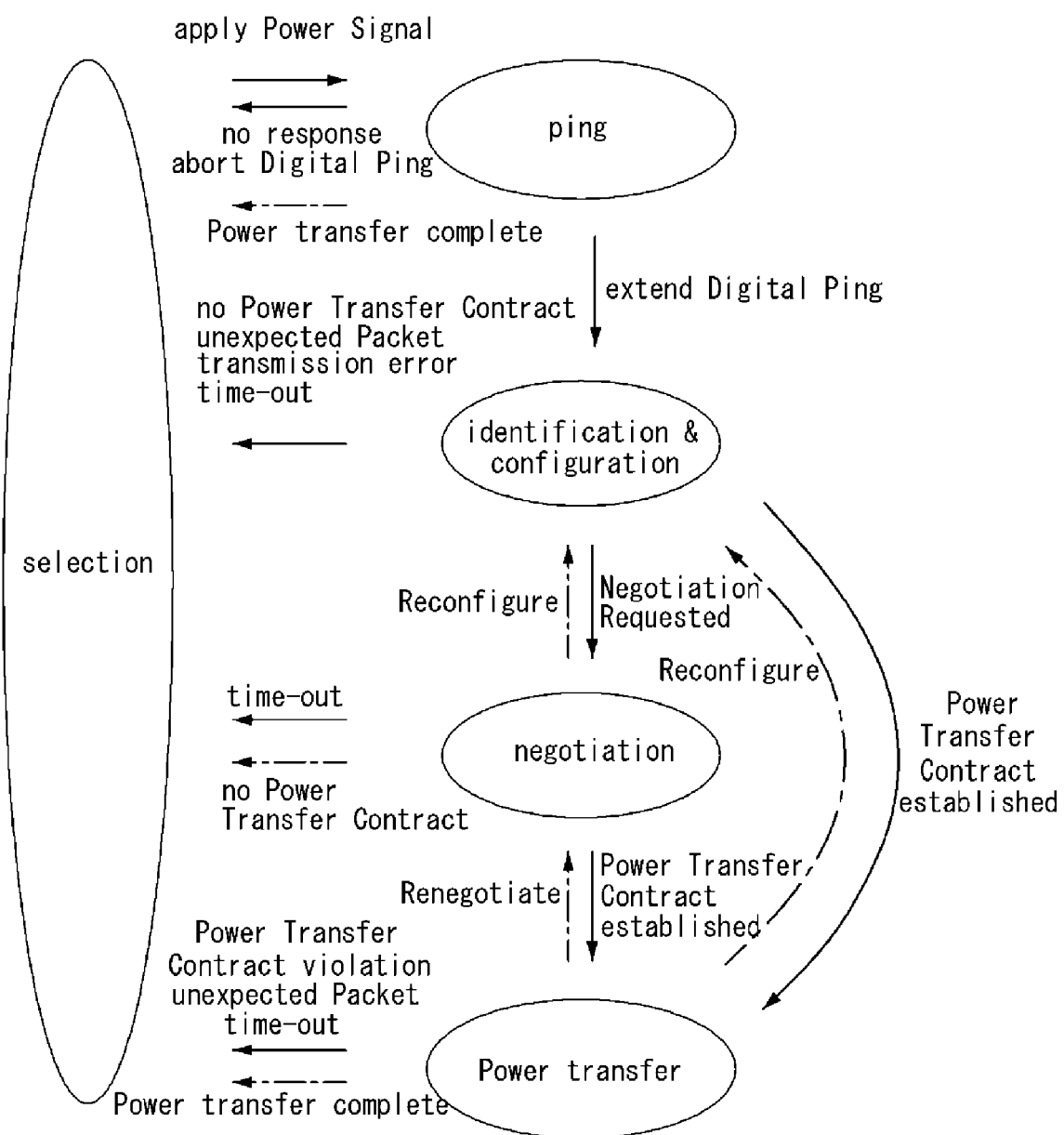

[FIG. 4]
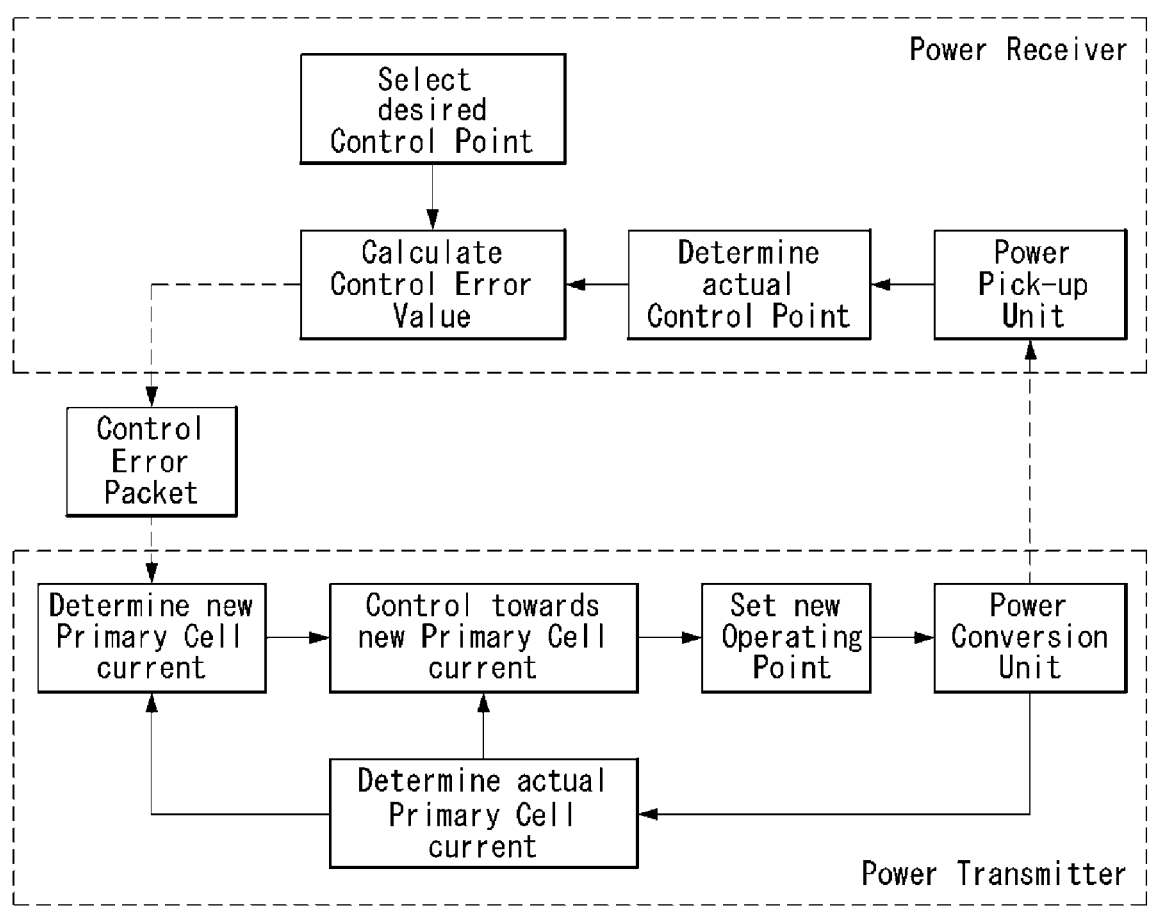

[FIG. 5]
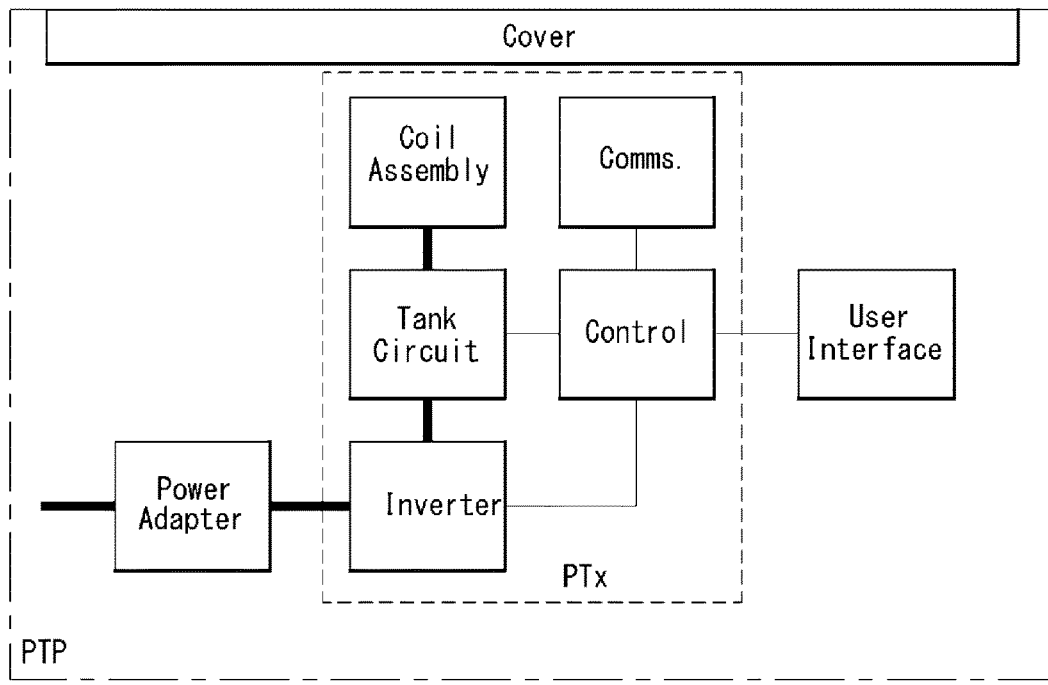
[FIG. 6]
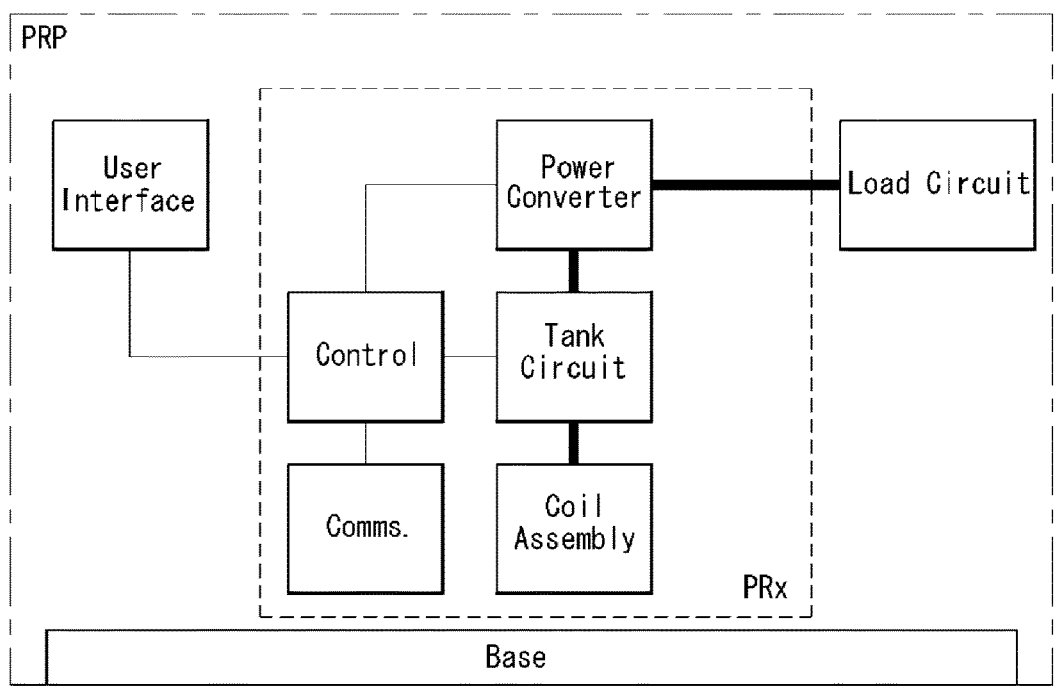

[FIG. 7]
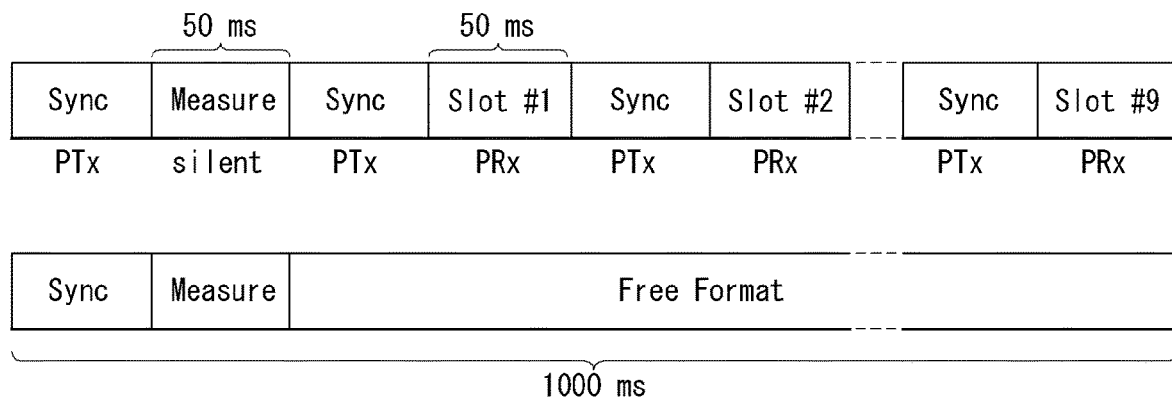
[FIG. 8]
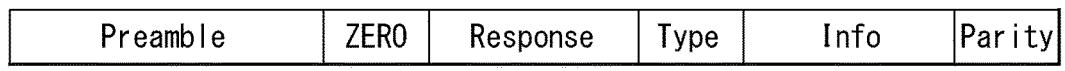
| Response | Type | Info(Type is ZERO) | Info(Type is ONE) |
|---|---|---|---|
| '00':no comms | ZERO:slot sync | '00':allocated | '00':slotted |
| '01':comms error | ONE:frame sync | '01':locked | '01':free format |
| '10':NAK | | '10':free | '10':reserved |
| '11':ACK | Parity :odd | '11':reserved | '11':reserved |

[FIG. 9]
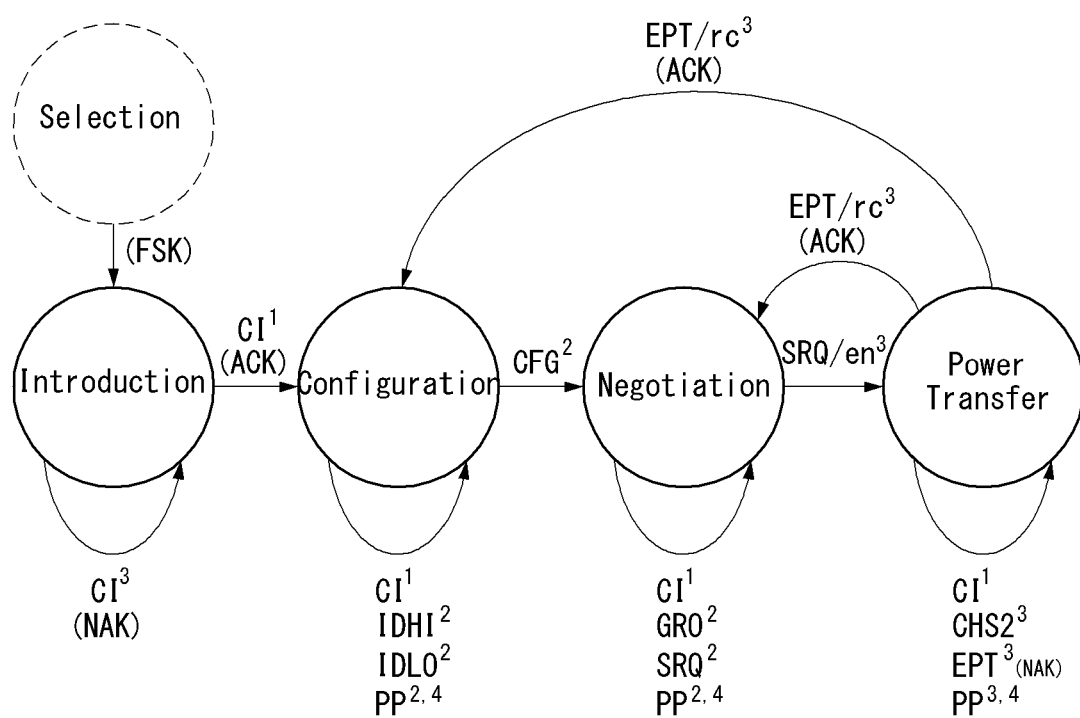

[FIG. 10]
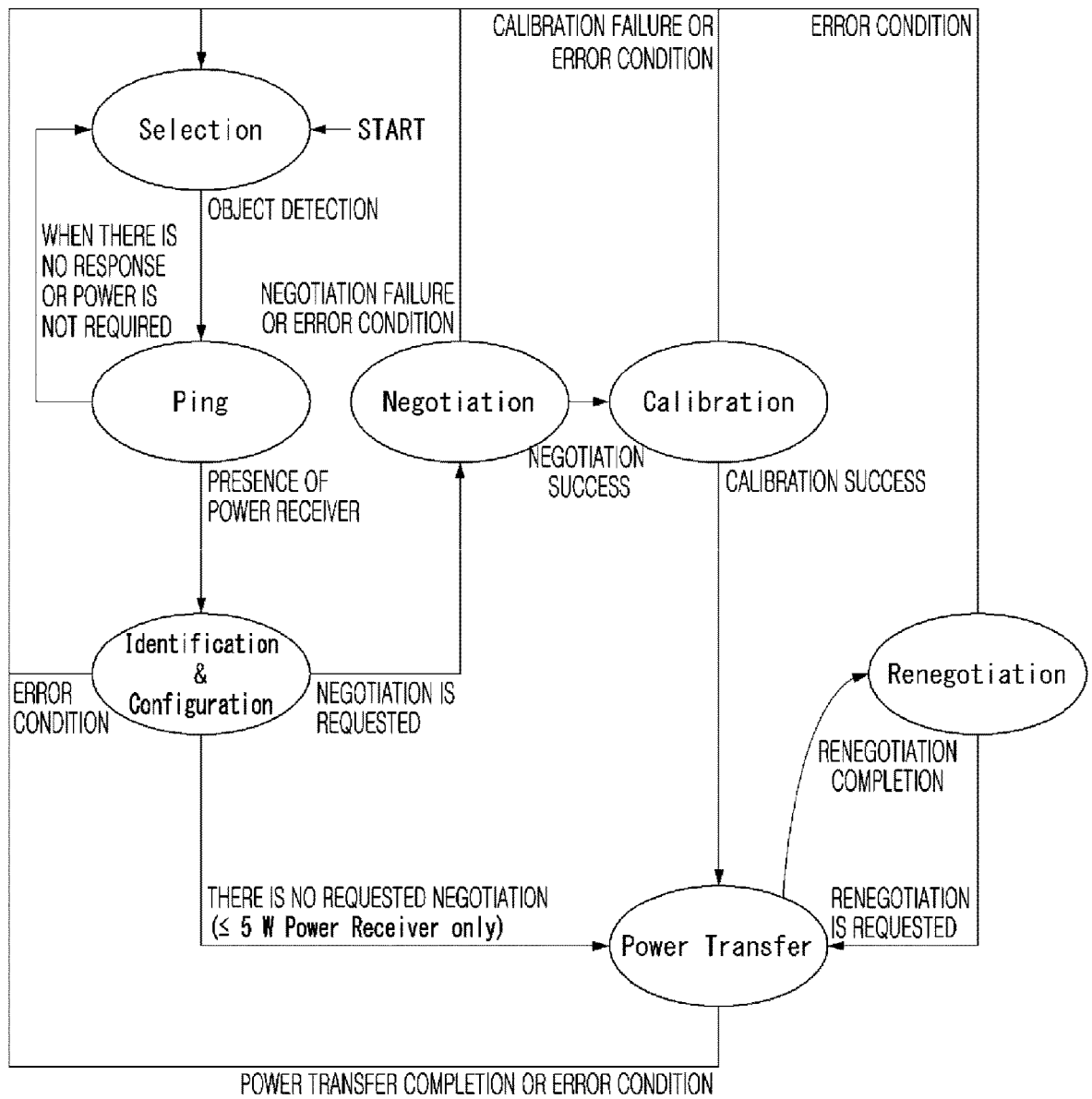

【FIG. 11】

| | $b_7$ | $b_6$ | $b_5$ | $b_4$ | $b_3$ | $b_2$ | $b_1$ | $b_0$ |
|---|---|---|---|---|---|---|---|---|
| $B_0$ | \multicolumn{8}{c|}{End Power Transfer Code} |

【FIG. 12】

| | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | Guaranteed Power Value | | | | | |
| $B_1$ | Reserved | | Potential Power Value | | | | | |
| $B_2$ | Reserved | | | | | NFC detection/ protection | WPID | Not Res Sens |

[FIG. 13]

| NFC detection/ protection bit/field in TX capability packet | | Next operation of RX |
|---|---|---|
| 0 | 0 | Activate RX's NFC function to detect RFID/NFC card by sending 'Re-ping-time' packet and 'EPT packet |
| 0 | 1 | Not available case. RX sends EPT packet to force TX to remove the electric power signal |
| 1 | 0 | Proceed to the calibration phase |
| 1 | 1 | Inform Users to remove the RFD/NFC card. Both TX and RX shall refrain from entering the power transfer until the RFD/NFC card in the proximity is removed |

[FIG. 14]

| | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | Guaranteed Power Value | | | | | |
| $B_1$ | Reserved | | Potential Power Value | | | | | |
| $B_2$ | Reserved | | | | | NFCPP | NFCD | WPID | Not Res Sens |

[FIG. 15]

| In TX capability packet | | Response to SR packet | Next operation of RX |
|---|---|---|---|
| NFCPP bit/field | NFCD bit/field | | |
| 0 | 0 | ND | Activate RX's NFC function to detect RFID/NFC card by sending 'Re-ping-time' packet and 'EPT packet(0x0c: re-ping)' |
| 0 | 1 | | |
| 1 | 0 | ACK | Proceed to the calibration phase |
| 1 | 1 | NACK | Inform Users to remove the RFD/NFC card. Both TX and RX shall refrain from entering the power transfer until the RFD/NFC card in the proximity is removed |

[FIG. 16]

| | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | Guaranteed Power Value | | | | | |
| $B_1$ | Reserved | | Potential Power Value | | | | | |
| $B_2$ | Reserved | | | | | NFC protection | WPID | Not Res Sens |

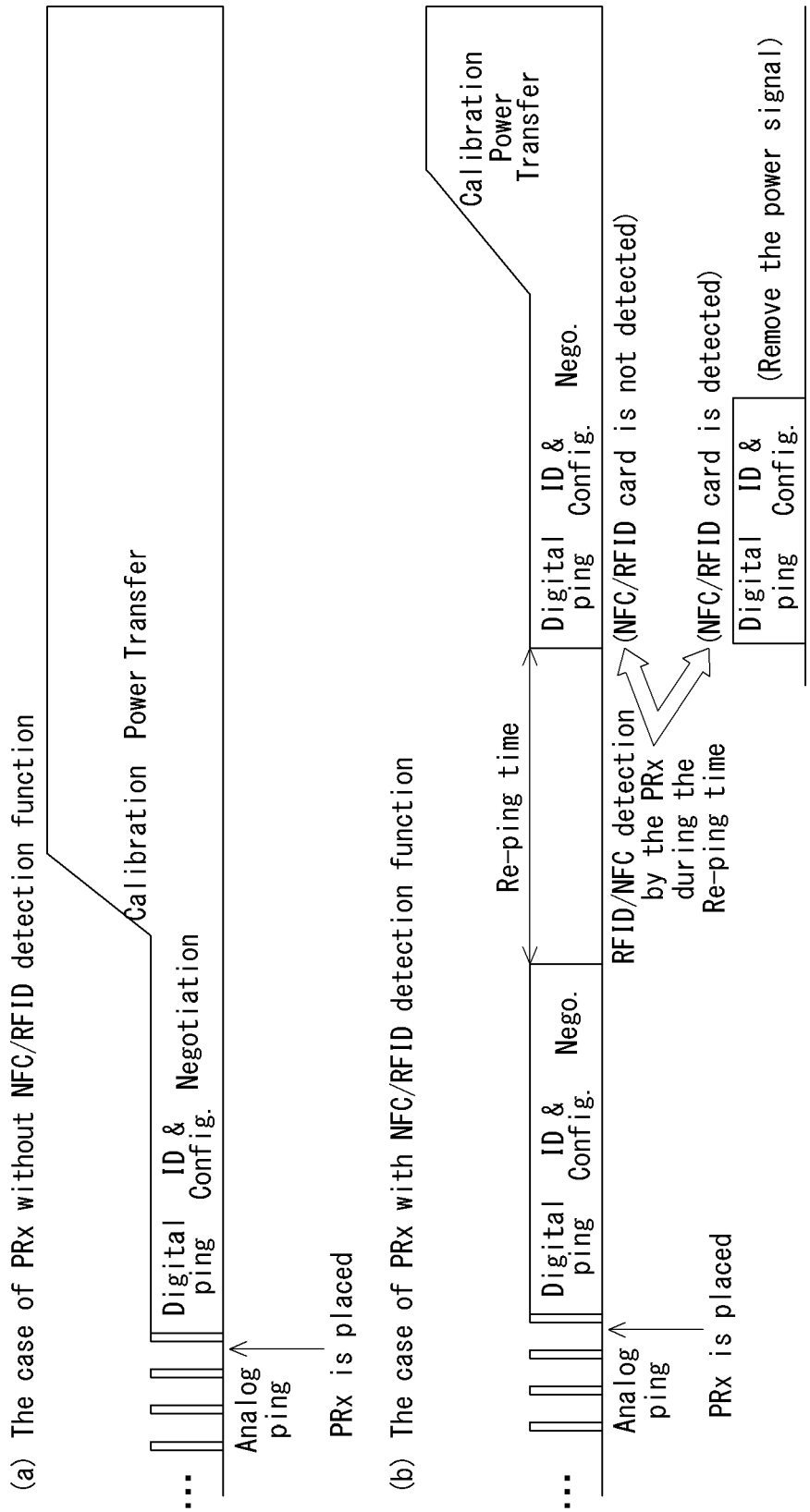
[FIG. 17]

[FIG. 18]
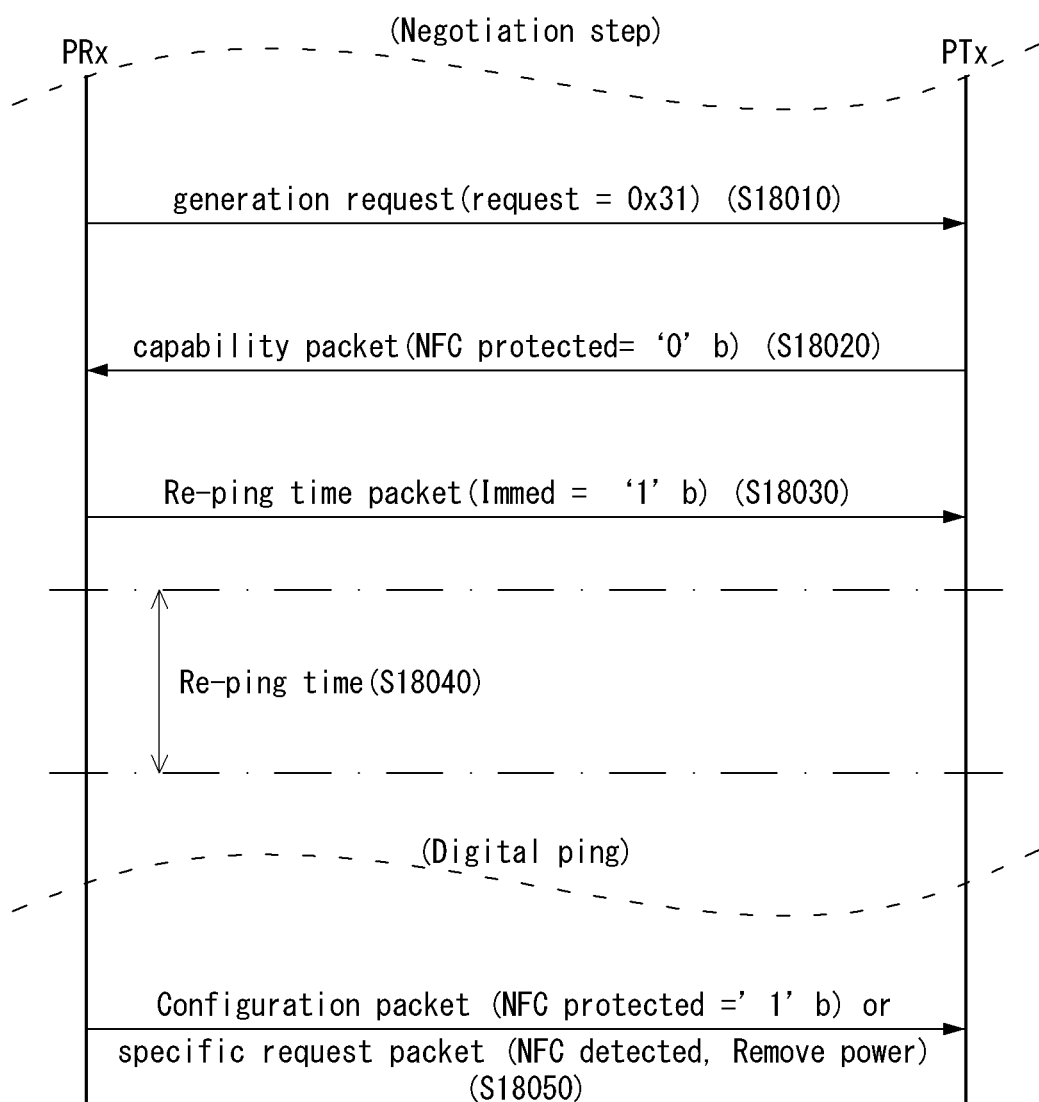

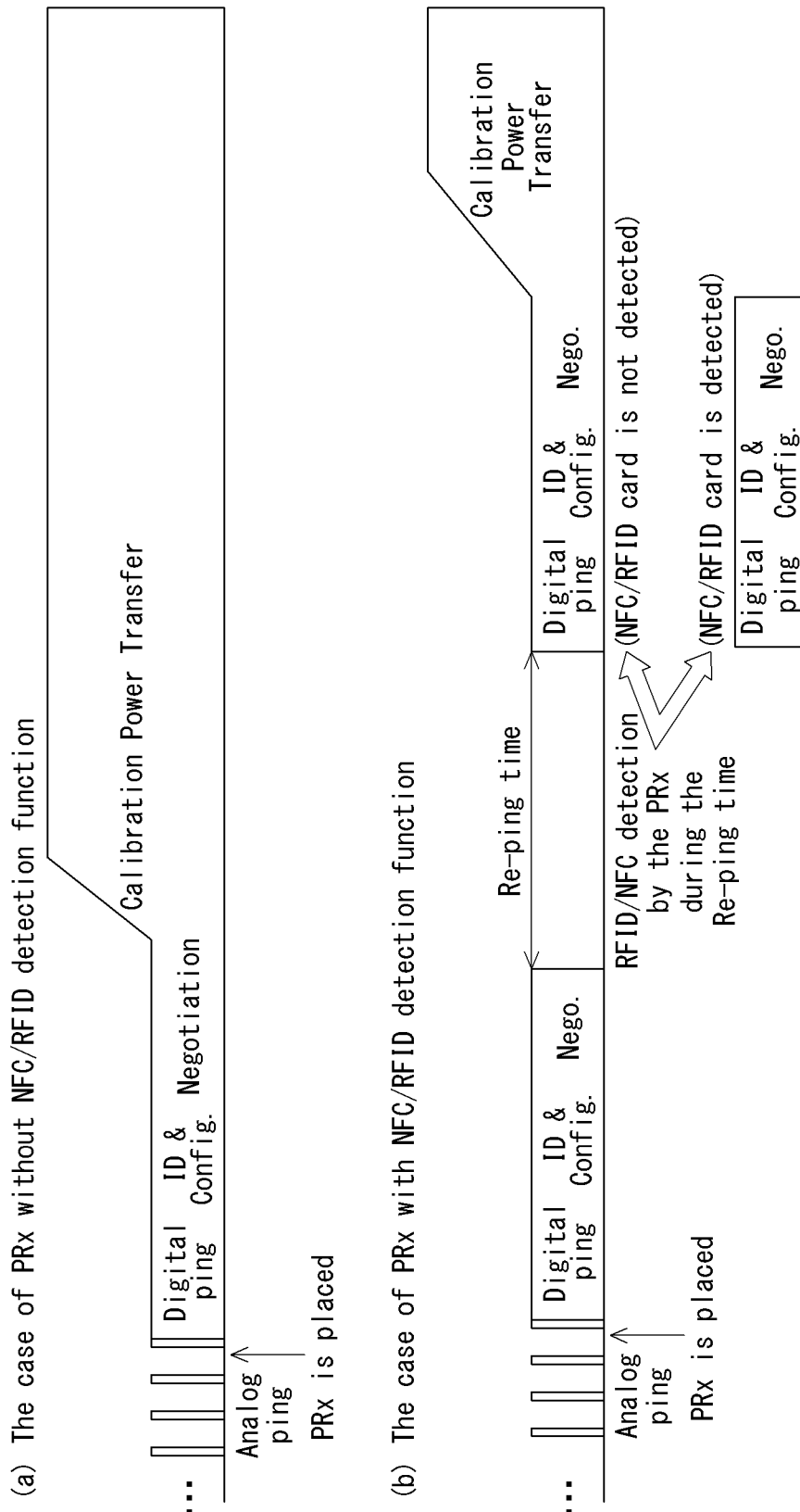
[FIG. 19]

[FIG. 20]
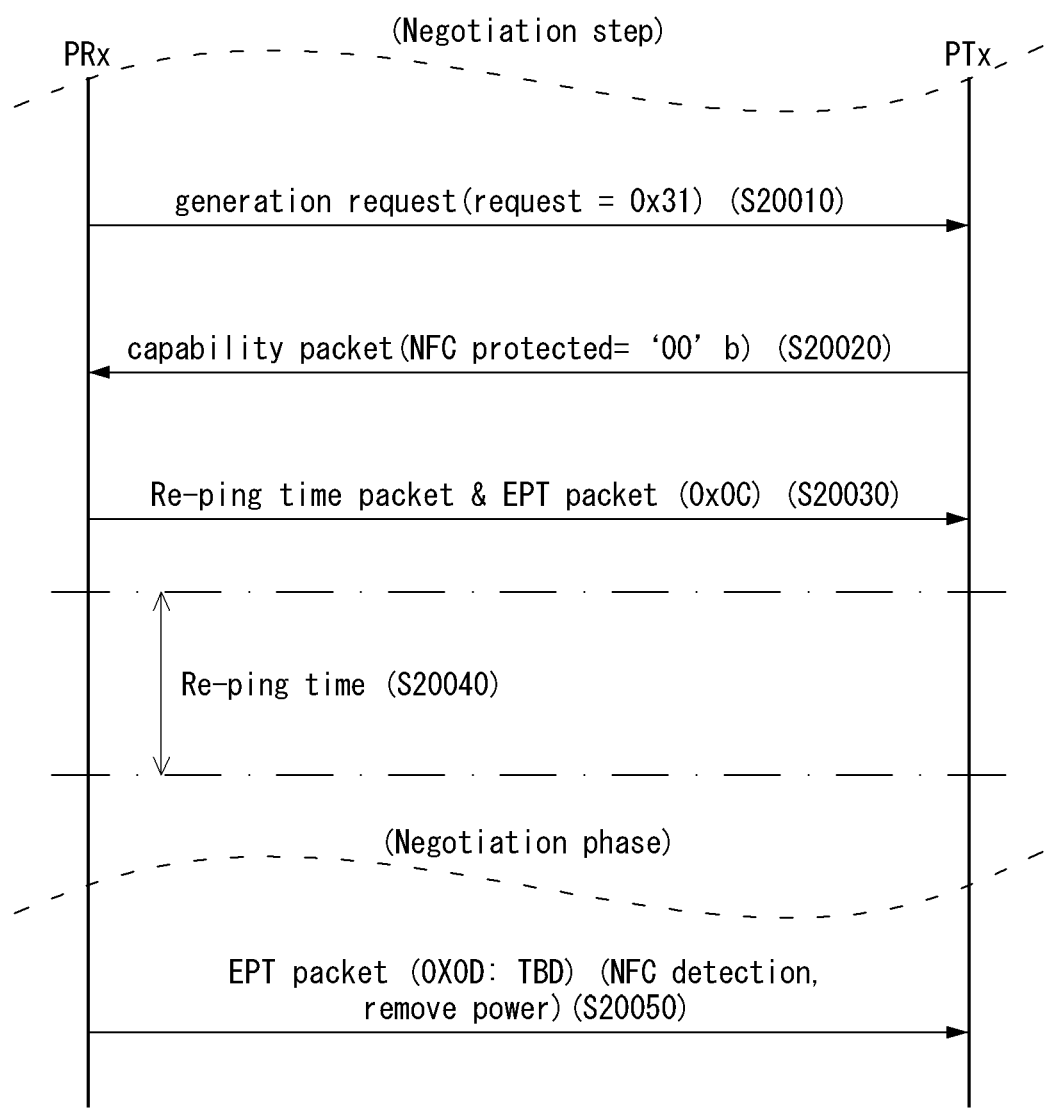

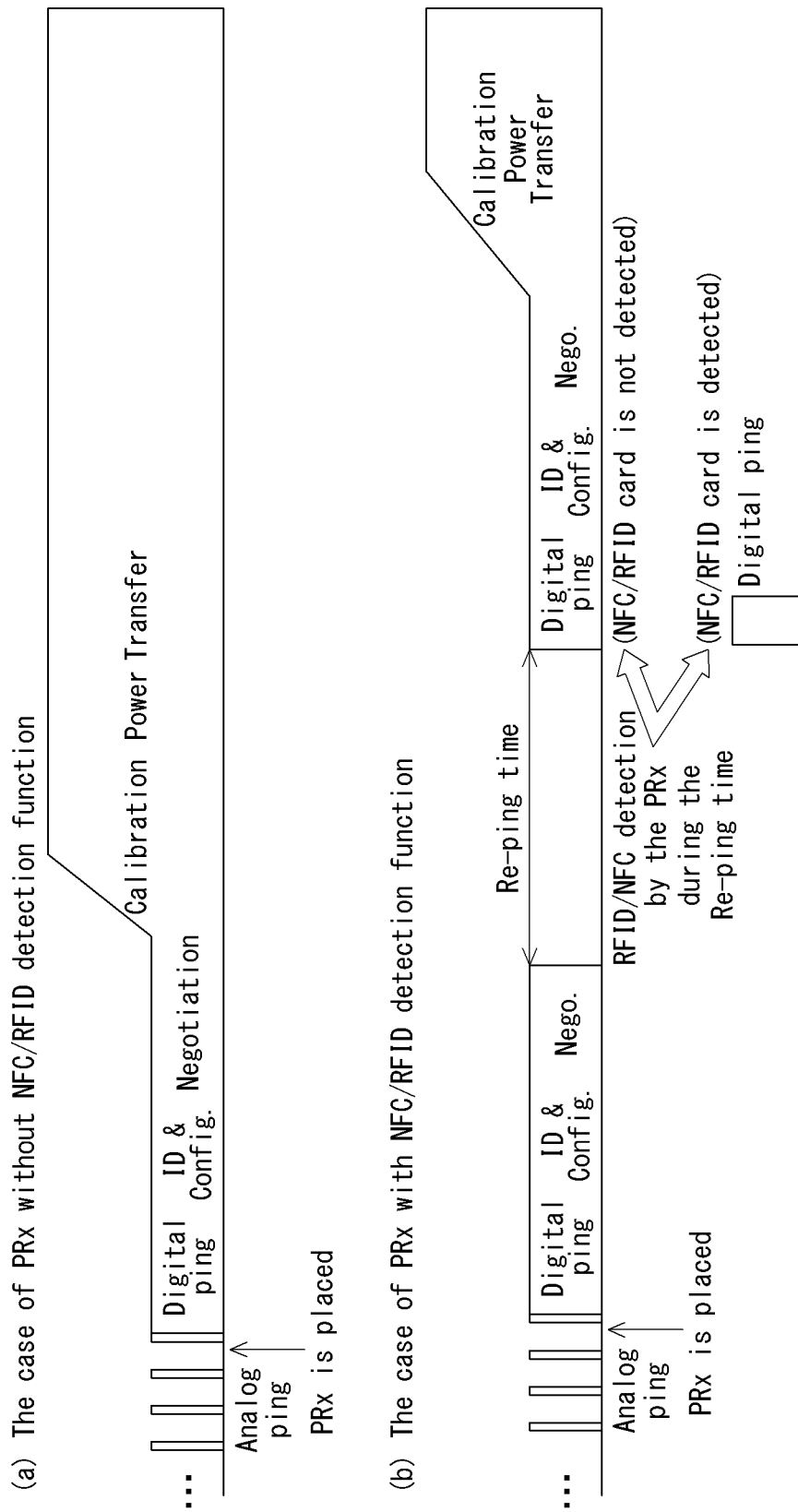
[FIG. 21]

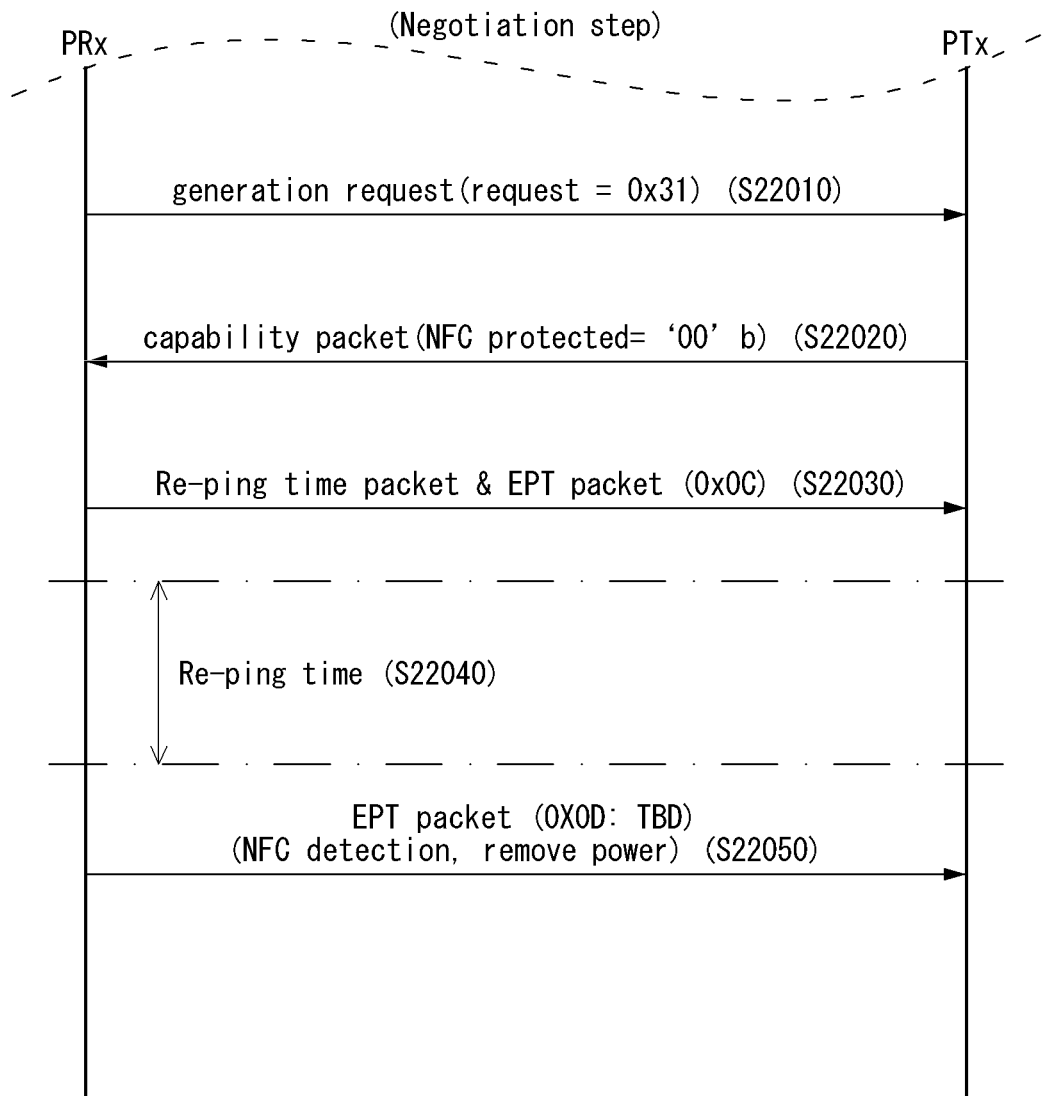

[FIG. 24]

|       | $b_7$ | $b_6$ | $b_5$ | $b_4$ | $b_3$ | $b_2$ | $b_1$ | $b_0$ |
|-------|-------|-------|-------|-------|-------|-------|-------|-------|
| $B_0$ | Power Class | | \multicolumn{6}{c}{Maximum Power Value} | | | | | |
| $B_1$ | Reserved | | | | | | | |
| $B_2$ | Prop | Reserved | | | ZERO | | Count | | |
| $B_3$ | Window Size | | | | | Window Offset | | |
| $B_4$ | Neg* | Polarity* | Depth* | | Reserved | | | NFC |

\* Applicable to the FOD extensions only.
  Without FOD extension support, these bits are Reserved.

【FIG. 25】

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | \multicolumn{8}{c}{Request} ||||||||
| $B_1$ | \multicolumn{8}{c}{Request Parameter} ||||||||

(a)

| Request | Description | Request Parameter |
|---|---|---|
| 0x00 | End Negotiation | Change count |
| 0x01 | Guaranteed Power | Guaranteed Power Value |
| 0x02 | Received Power Packet Type | Received Power Packet Header |
| 0x03 | FSK Parameters | Polarity and depth |
| 0x04 | Maximum Power | Maximum Power Value |
| 0x05 to 0xEF | Reserved | N.A. |
| 0xF0 to 0xFF | Proprietary | Proprietary |

(b)

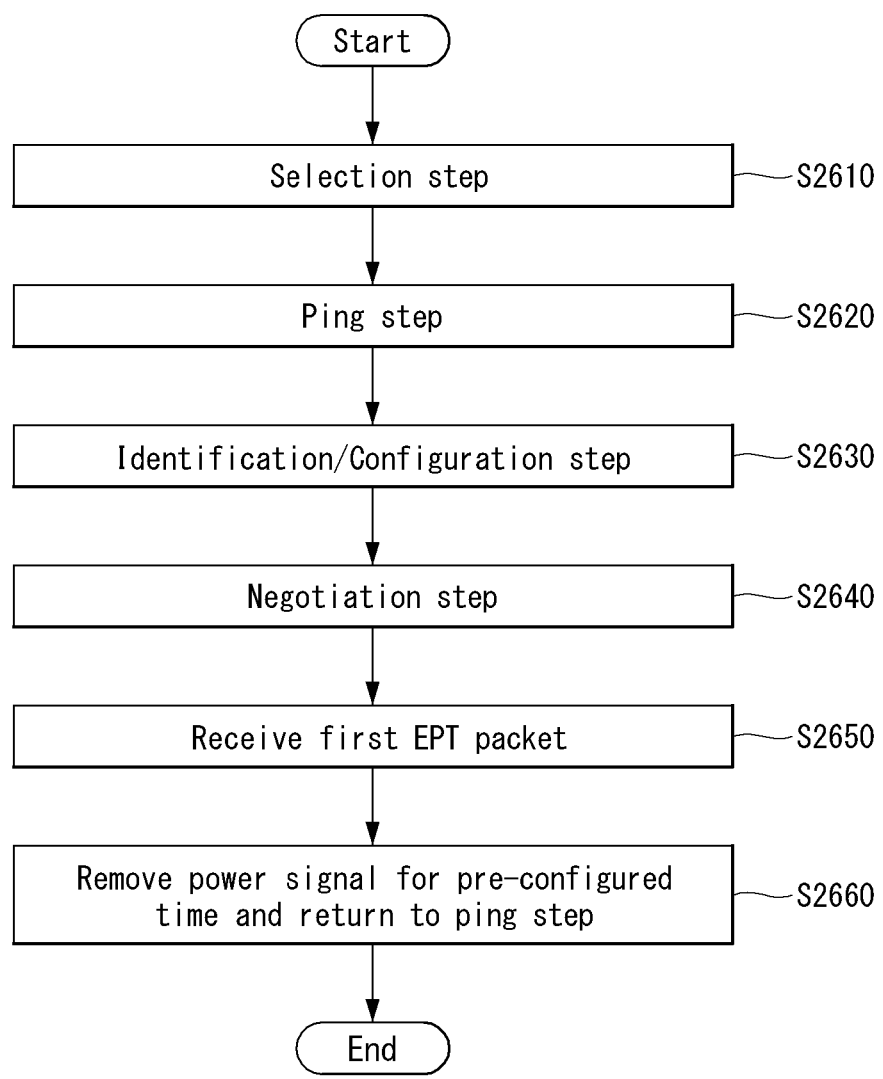

WIRELESS POWER TRANSFERRING METHOD AND DEVICE THEREFOR

CROSS-REFERENCE TO RELATED APPLICATIONS

This application is a continuation of U.S. application Ser. No. 16/315,894, filed on Jan. 7, 2019, which is a National Stage application under 35 U.S.C. § 371 of International Application No. PCT/KR2017/010050, filed on Sep. 13, 2017, which claims the benefit of U.S. Provisional Application No. 62/457,976, filed on Feb. 12, 2017, U.S. Provisional Application No. 62/447,923, filed on Jan. 19, 2017, U.S. Provisional Application No. 62/425,039, filed on Nov. 21, 2016, U.S. Provisional Application No. 62/400,640, filed on Sep. 28, 2016, and U.S. Provisional Application No. 62/398,529, filed on Sep. 23, 2016. The disclosures of the prior applications are incorporated by reference in their entirety.

TECHNICAL FIELD

The present invention relates to a wireless power transferring method and a device therefor.

BACKGROUND ART

A contactless wireless charging method is an energy transfer method for electromagnetically transferring energy without using a wire in a method for transmitting energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

DISCLOSURE

Technical Problem

When a Radio Frequency Identification (RFID) card or a Near Field Communication (NFC) card is placed between a power transmitter (e.g., wireless charger) and a power receiver (e.g., mobile device, etc.), a power transmitter without having RFID/NFC detection function cannot detect an RFID/NFC card. In addition, even with the FOD method defined by WPC, which is a standard for a wireless power transmission/reception system, the power transceiver cannot detect the RFID/NFC card. The reason is that the FOD method defined in the WPC is defined to detect foreign object based on how much power transmitted from the power transmitter to the power receiver is lost (e.g., if the transmission efficiency is below a pre-configured level), but in the case of an RFID/NFC card, even if it is placed between the power transmitter and the power receiver, power loss does not occur. Furthermore, since the operating frequency (e.g., about 100 to 205 kHz) of the electric power transceiver defined in the WPC is different from the operating frequency of the RFID/NFC card (e.g., about 13.56 MHz), even with the frequency it is difficult to detect the RFID/NFC card.

If the wireless power transceiver fails to detect the presence of the RFID/NFC card and maintains the power transmission, there exists the problem that the RFID/NFC card continuously exposed to a strong magnetic field may eventually be damaged and causes financial/property damage to a user. Furthermore, stability problems due to the heat generation of the RFID/NFC card can be raised.

Therefore, in the present specification, a method for detecting such an RFID/NFC card will be proposed. The description of the embodiments proposed herein can be cooperated with the WPC Qi wireless power transmission system power class 0 specification Version 1.2.3 and Version 1.3.

Technical Solution

According to the present invention, a method for transferring wireless power by a power transmitter, the method comprises: a selection step of monitoring a placement or a removal of an object on or from an interface surface of the power transmitter; a ping step of performing a digital ping and receiving a response from a power receiver; an identifying/configuring step of receiving a configuration packet including configuration information of the power receiver; and a negotiating step of transmitting a capability packet including information on a level of power transferred by the power transmitter, wherein the capability packet may include an NFC detection field indicating whether the power transmitter has a capability of detecting an Radio-Frequency Identification (RFID) and/or an Near Field Communication (NFC), and/or whether the RFID and/or the NFC is detected, and when the NFC detection field indicates that the power transmitter does not have the capability of detecting the RFID and/or the NFC, the method further comprising steps of: receiving a first End Power Transfer (EPT) packet for indicating a termination of a power transfer from the power receiver; wherein the first EPT packet includes a first EPT code requesting a removal of a power signal for a pre-configured time, removing the power signal for the pre-configured time, and returning to the ping step.

Further, the NFC detection field may be divided into a first subfield indicating whether the power transmitter has the capability of detecting the RFID and/or the NFC, and a second subfield indicating whether the RFID and/or the NFC is detected.

Further, the method for transferring wireless power may comprise a step of further comprising a step of receiving a second EPT packet from the power receiver, when re-performing the digital ping according to the returning to the ping step, wherein the second EPT packet may include a second EPT code requesting the removal of the power signal as the RFID and/or the NFC is detected by the power receiver for the pre-configured time.

Further, the method for transferring wireless power may further comprise a step of removing the power signal, and providing a detection result of the RFID and/or the NFC to a user when the second EPT packet is received.

Further, the method for transferring wireless power may further comprise steps of a calibration step of adjusting a specific parameter to improve the foreign object detection capability during the power transfer of the power transmitter, when the NFC detection field indicates that the power transmitter has the capability of detecting the RFID and/or the NFC, and the RFID and/or the NFC is not detected, and a step of not entering the calibration step, when the NFC detection field indicates that the power transmitter has the capability of detecting the RFID and/or the NFC, and the RFID and/or NFC is detected.

Further, the step of not entering the calibration step may further comprise the step of removing the power signal and providing a detection result of the RFID and/or the NFC detection to a user.

Further, the pre-configured time may be indicated via a packet transmitted from the power receiver in the negotiating step.

Further, the packet may include a field indicating the time at which the power transmitter removes the electric power signal.

Further, the field may indicate the power transmitter to immediately remove the power signal or to remove the power signal when the power transmitter receives the first EPT packet.

Further, the packet may indicate the pre-configured time in units of 0.2 seconds.

Further, the capability packet may be transmitted as a response to a general request field transmitted from the power receiver.

Further, a power transmitter according to another invention comprises a coil assembly comprising at least one primary coil to generate a magnetic field; a power conversion unit configured to convert electric energy into a power signal; and a communication and control unit configured to control a communication with a power receiver and a power transfer, wherein the communication and control unit is further configured to: monitor a placement or a removal of an object on or from an interface surface of the power transmitter; perform a digital ping and receive a response from the power receiver; receive a configuration packet including configuration information of the power receiver; and transmit a capability packet including information on a level of power transferred by the power transmitter, wherein the capability packet may include an NFC detection field indicating whether the power transmitter has a capability of detecting an Radio-Frequency Identification (RFID) and/or an Near Field Communication (NFC), and/or whether the RFID and/or the NFC is detected, and when the NFC detection field indicates to the power transmitter that there is no ability to detect the RFID and/or the NFC, the communication and control unit may receive a first End Power Transfer (EPT) packet for indicating a termination of the power transfer from the power receiver, wherein the first EPT packet includes a first EPT code requesting a removal of a power signal for a pre-configured time, and remove the power signal for the pre-configured time, and re-performing the digital ping.

Further, the NFC detection field may be divided into a first subfield indicating whether the power transmitter has the capability of detecting the RFID and/or the NFC, and a second subfield indicating whether the RFID and/or the NFC is detected.

Further, a power receiver according to another invention comprises, a coil assembly including at least one secondary coil to receive power; a power pick-up unit configured to convert a power signal received through the coil assembly into electric energy; an NFC functional unit configured to detect Radio Frequency Identification (RFID) and/or Near Field Communication (NFC); and a communication and control unit configured to control a communication with the power transmitter and a power transfer; wherein the communication and control unit further configured to: transmit a response for a digital ping of the power transmitter; transmit a configuration packet including configuration information of the power receiver; and receive a capability packet including information on a level of power transferred by the power transmitter, wherein the capability packet may include an NFC detection field indicating whether the power transmitter has a capability of detecting an Radio-Frequency Identification (RFID) and/or an Near Field Communication (NFC), and/or whether the RFID and/or the NFC is detected, and when the NFC detection field indicates to the power transmitter that there is no ability to detect the RFID and/or the NFC, the communication and control unit may transmit a first End Power Transfer (EPT) packet for indicating a termination of a power transfer from the power receiver; wherein the first EPT packet includes a first EPT code requesting a removal of a power signal for a pre-configured time, and detect the RFID and/or the NFC using the NFC functional unit for the pre-configured time.

Further, the NFC detection field may be divided into a first subfield indicating whether the power transmitter has the capability of detecting the RFID and/or the NFC, and a second subfield indicating whether the RFID and/or the NFC is detected.

Advantageous Effects

According to an embodiment of the present invention, an RFID/NFC (card/tag) can be efficiently detected while maintaining compatibility with the wireless power charging protocol defined in the WPC standard, and thus it has the effect of preventing damage to the RFID/NFC (card/tag) of a user and solving the safety problem that may occur due to the heat generation of the RFID/NFC (card/tag).

In addition, various effects according to the embodiment of the present invention will be described below in detail.

DESCRIPTION OF DRAWINGS

FIG. 1 illustrates an embodiment of various electronic devices into which a wireless charging system is introduced.

FIG. 2 illustrates a wireless power transmission/reception system according to an embodiment of the present invention.

FIG. 3 is a block diagram illustrating a power transmission/reception method in an inductive mode.

FIG. 4 illustrates a power transmission control method in the inductive mode.

FIG. 5 illustrates a power transmission device according to an embodiment of the present invention.

FIG. 6 illustrates a power reception device according to an embodiment of the present invention.

FIG. 7 illustrates a frame structure for data communication during power transmission.

FIG. 8 is a diagram illustrating a sync packet according to an embodiment of the present invention.

FIG. 9 is a diagram illustrating a power transmission method in a shared mode.

FIG. 10 is a diagram illustrating a method for controlling a wireless power transmission/reception system to which FOD extension is applied according to an embodiment of the present invention.

FIG. 11 illustrates an EPT packet format defined in the current WPC standard.

FIG. 12 illustrates a capability packet format according to a first embodiment of the present invention.

FIG. 13 is a table illustrating a next operation of a power receiver receiving an NFC detection/protection bit/field according to an embodiment of the present invention.

FIG. 14 illustrates a capability packet format according to a second embodiment of the present invention.

FIG. 15 is a table illustrating the next operation of a power receiver that has received NFCPP and NFCD bits/fields according to an embodiment of the present invention.

FIG. 16 illustrates a capability packet format according to a third embodiment of the present invention.

FIG. 17 illustrates an RFID/NFC detection method of a power receiver according to the first embodiment of the present invention.

FIG. 18 is a flowchart showing the embodiment of FIG. 17 in terms of operation of a power transmitter and a power receiver.

FIG. 19 illustrates an RFID/NFC detection method of a power receiver according to a second embodiment of the present invention.

FIG. 20 is a flowchart showing the embodiment of FIG. 19 in terms of operation of a power transmitter and a power receiver.

FIG. 21 illustrates an RFID/NFC detection method of a power receiver according to a third embodiment of the present invention.

FIG. 22 is a flowchart showing the embodiment of FIG. 21 in terms of operation of a power transmitter and a power receiver.

FIG. 23 illustrates a re-ping time packet format according to an embodiment of the present invention.

FIG. 24 illustrates a configuration packet format according to an embodiment of the present invention.

FIG. 25 illustrates a specific request packet format according to an embodiment of the present invention.

FIG. 26 is a flowchart illustrating a power transfer method of a power transmitter according to an embodiment of the present invention.

BEST MODE FOR INVENTION

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

FIG. 1 illustrates an embodiment of various electronic devices into which a wireless charging system is introduced. In FIG. 1, electronic devices are classified according to an amount of power transmitted and received in the wireless charging system.

Low power (approximately 5 W or less or approximately 20 W or less) wireless charging may be applied to wearable devices such as a smart clock and smart glass and mobile/portable electronic devices such as an earphone, a remote controller, a smart phone, PDA, a tablet PC, etc. Medium power (approximately 50 W or less or approximately 200 W or less) may be applied to medium and small appliances such as notebook computers, robot cleaners, TVs, sound devices, cleaners, monitors, and the like. In addition, large power (approximately 2 kW or less or 22 kW or less) wireless charging may be applied to kitchen appliances such as a blender, a microwave oven, and an electric rice cooker, personal mobile devices such as a wheelchair, an electric kickboard, an electric bicycle, and an electronic device/moving means such as an electric vehicle, etc. The electronic devices/moving means illustrated in FIG. 1 may include a power receiver to be described below.

Hereinafter, a low power and a mobile device will be mainly described, but this relates to an embodiment, and the wireless power transmission/reception method according to the present invention may be applied to various electronic devices described above.

Wireless Power Consortium (WPC) standardizes wireless power transmission/reception related technology for standardization of wireless power transmission/reception devices.

The recently developed wireless charging system may support low power transmission and reception up to approximately 5 W. However, recently, a size of a mobile device becomes large and a battery capacity also increases, in the case of such a low power charging system, there is a problem in that a charging time is long and efficiency is lowered, and as a result, a wireless charging system for supporting medium power transmission and reception of up to approximately 15 W to 20 W. At the same time, a wireless charging system having a resonance method added to charge a plurality of electronic devices has also been developed. The present invention relates to a wireless charging system having a resonance method added and intends to propose a resonance type wireless charging transmitter/receiver that is compatible with a low-power/medium-power induction-type wireless charging transmitter/receiver.

Hereinafter, the inductive and resonant wireless charging transmitter and wireless charging receiver proposed by the present invention and a charging method and a communication protocol using the same will be described. Further, hereinafter, a resonance type/mode may be referred to as a shared type/mode. In addition, hereinafter, the wireless power transmitter may be referred to as a power transmitter or transmitter and the wireless power receiver may be referred to as a power receiver or receiver.

FIG. 2 illustrates a wireless power transmission/reception system according to an embodiment of the present invention.

In FIG. 2, the wireless power transmission/reception system includes a mobile device and a base station that receive power wirelessly.

The mobile device includes a power receiver that receives wireless power through a secondary coil and a load that receives and stores the power received by the power receiver and supplies the received and stored power to a device. In addition, the power receiver may include a power pick-up unit that receives a wireless electric power signal communication and converts the received wireless electric power signal into electric energy through the secondary coil and a communications and control unit that controls communication and electric power signal transmission/reception (power transfer/reception) with the power transmitter. The mobile device may also be referred to below as a power reception device.

The base station as an apparatus that provides inductive power or resonant power may include one or more power transmitters and system units. The power transmitter may transmit the inductive/resonant power and control power transmission. The power transmitter may include a power conversion unit that generates a magnetic field through a primary coil(s) and converts/transmits the electric energy into an electric power signal and a communications and control unit that controls communication and power transfer with the power receiver so as to transmit the power at an appropriate level. The system unit may perform other operation controls such as input power provisioning, control of a plurality of power transmitters, and user interface control. The base station may also be referred to below as a power transmission device.

The power transmitter may control transmission power by controlling an operating point. The controlled operating point may correspond to a combination of a frequency, a duty cycle, and a voltage amplitude. The power transmitter may control the transmitted power by adjusting at least one of the frequency, the duty cycle/duty ratio, and an amplitude of input voltage. Further, the power transmitter may supply constant power and the power receiver may control the received power by controlling a resonant frequency.

A coil or coil portion may hereinafter be referred to as a coil assembly, a coil cell, or a cell, including the coil and at least one element adjacent to the coil.

Inductive Mode—Low Power and Mid Power

Hereinafter, a power transfer method of the power transmitter/receiver operating in the inductive mode will be described first. However, at least one of a method for describing the inductive mode or phases included in the method may be used selectively or optionally in the resonant mode.

FIG. 3 is a block diagram illustrating a power transmission/reception method in an inductive mode.

In the wireless charging system according to the present invention, the wireless charging may be performed through five phases. The five phases may include a selection phase, a ping phase, an identification and configuration phase, a negotiation phase, and a power transfer phase and however, the negotiation phase may be omitted in the low power-mode power transmission/reception. That is, in the lower power mode, the power transmission/reception may be performed by four phases and in the intermediate power mode, the negotiation phase may be additionally performed.

In the selection phase, the power transmitter monitors contact/departure of an object with respect to an interface surface provided in the transmitter. As shown in FIG. 2, the wireless power transmitter may sense the contact of an external object by applying the electric power signal. In other words, the power transmitter applies a short electric power signal to the primary coil and senses the current of the primary coil generated by the electric power signal to monitor the presence of the external object. In addition, when the power transmitter receives signal strength information (packet) monitored in the selection phase and detects the object based on the received signal strength information (packet), the power transmitter may select whether the object is the power receiver or a simple external object (a key, a coin, etc.). For such a selection, the power transmitter may further perform at least one of the following phases: the ping phase, the identification/configuration phase, and the negotiation phase.

In the ping phase, the power transmitter may perform digital ping and wait for the response of the power receiver. The digital ping represents the application/transmission of the electric power signal to detect and identify the power receiver. When the power transmitter finds the power receiver, the power transmitter may extend the digital ping to proceed to the identification/configuration phase.

In the identification/configuration phase, the power transmitter may identify the selected power receiver and obtain configuration information of the power receiver, such as a maximum power amount. In other words, the power transmitter may receive the identification/configuration information, obtain information on the power receiver, and use the information to establish a power transfer contract. This power transfer contract may include constraints on a plurality of parameters that characterize power transfer in a subsequent power transfer phase.

In the negotiation phase, the power receiver may negotiate with the power transmitter to create an additional power transfer contract. In other words, the power transmitter may receive a negotiation request/information from the power receiver and the negotiation phase may be performed only if a target receiver is identified as an intermediate power receiver in the identification/configuration phase. In the negotiation phase, additional parameters such as the guaranteed power level of the power transmitter and the maximum power of the power receiver may be negotiated. When the power receiver is a low-power receiver, the negotiation phase may be omitted and the identification/configuration phase may directly proceed to the power transfer phase.

In the power transfer phase, the power transmitter provides power wirelessly to the power receiver. The power transmitter receives control data for transmitted power to control power transfer accordingly. In addition, when restrictions of the parameters depending on the power transfer contract are violated during the power transfer, the power transmitter may stop the power transfer and proceed to the selection phase.

FIG. 4 illustrates a power transfer control method in the inductive mode.

In FIG. 4, each of the power transmitter and the power receiver may include a power conversion unit and a power pickup unit, respectively, as illustrated in FIG. 1.

In the power transfer phase of the inductive mode described above, the power transmitter and the power receiver may control the amount of power transferred by parallel communication with power transmission and reception. The power transmitter and the power receiver operate at a specific control point. The control point represents a combination of voltage and current provided at an output of the power receiver when the power transfer is performed.

In more detail, the power receiver selects a desired control point—desired output current/voltage, a temperature of a specific location of the mobile device, etc., and determines an actual control point which currently operates at present. The power receiver may calculate a control error value by using the desired control point and the actual control point and transmit the control error value as a control error packet to the power transmitter.

In addition, the power transmitter sets/controls a new operating point—the amplitude, the frequency, and the duty cycle—by using the received control error packet to control the power transfer. Accordingly, the control error packet is transmitted/received at a pre-configured time interval in the power transfer phase and as the embodiment, the power receiver may set and transmit a control error value as a negative value in the case of intending to decrease the current of the power transmitter and set and transmit the control error value as a positive value in the case of intending to increase the current. As described above, in the inductive mode, the power receiver transmits the control error packet to the power transmitter to control the power transfer.

The resonance mode to be described below may operate in a different manner from that in the inductive mode. In the resonant mode, one power transmitter needs to be able to charge a plurality of power receivers simultaneously. However, in the case of controlling the power transfer as in the inductive mode described above, the power to be transferred is controlled by communication with one power receiver, and as a result, it may be difficult to control the power transfer for additional power receivers. Therefore, in the resonant mode of the present invention, a method is to be used, in which the power transmitter commonly transfers basic power and the power receiver controls a resonant frequency thereof to control the amount of received power. However, the method described in FIG. 4 is not completely excluded in the operation of the resonant mode and additional transmission power may be controlled by the method of FIG. 4.

Shared Mode (Resonant Mode)

FIG. 5 illustrates a power transmission device according to an embodiment of the present invention.

In FIG. 5, the power transmission device may include at least one of a cover covering a coil assembly, a power adapter supplying power to the power transmitter, a power transmitter transmitting wireless power, or a user interface providing power transfer progress and other pertinent information. In particular, the user interface may be optionally included or may be included as another user interface of the power transmission device.

The power transmitter may include at least one of the coil assembly, a tank circuit (or impedance matching circuit), an inverter, a communication unit or a control unit.

The coil assembly includes at least one primary coil that generates the magnetic field and may be referred to as a coil cell.

The impedance matching circuit may provide impedance matching between the inverter and the primary coil(s). The impedance matching circuit may cause resonance at a suitable frequency to boost primary coil current. The impedance matching circuit in a multi-coil power transmitter may further include a multiplexer that routes a signal from the inverter to a subset of the primary coils. The impedance matching circuit may be referred to as a tank circuit.

The inverter may convert a DC input signal into an AC signal. The inverter may be driven as a half-bridge or full-bridge to produce a pulse wave and the duty cycle of an adjustable frequency. Further, the inverter may include a plurality of stages so as to adjust an input voltage level.

The communication unit may perform communication with the power receiver. The power receiver performs load modulation to communicate a request and information for the power transmitter. Thus, the power transmitter may monitor an amplitude and/or a phase of current and/or voltage of the primary coil in order to demodulate data transmitted by the power receiver by using the communication unit. Further, the power transmitter may control output power to transmit data using a frequency shift keying (FSK) method or the like through the communication unit. To this end, a wireless charger may additionally include a current sensor to detect the receiver by detecting a current change of the primary coil, and to detect the transmitted data of the detected receiver.

The control unit may control communication and power transfer of the power transmitter. The control unit may control power transmission by adjusting the operating point. The operating point may be determined, for example, by at least one of an operating frequency, the duty cycle, and an input voltage.

The communication unit and the control unit may be provided as a separate unit/element/chipset or may be provided as one unit/element/chipset as illustrated in FIG. 2.

Although not shown in the figure, a Radio Frequency Identification (RFID)/Near Field Communication (NFC) reader unit (or an NFC function unit) for detecting the RFID/NFC cards may be further mounted on a power transmitter.

FIG. 6 illustrates a power reception device according to an embodiment of the present invention.

In FIG. 6, the power reception device may include at least one of a user interface that provides power transfer progress and other pertinent information, a power receiver that receives wireless power, a load circuit, or a base that supports and covers the coil assembly. In particular, the user interface may be optionally included or may be included as another user interface of the power transmission device.

The power receiver may include at least one of the power converter, the tank circuit (or impedance matching circuit), the coil assembly, the communication unit, and the control unit.

The power converter may convert AC power received from the secondary coil to voltage and current suitable for the load circuit. As the embodiment, the power converter may include a rectifier. Additionally, the power converter may adapt reflected impedance of the power receiver.

The impedance matching circuit may provide impedance matching between a combination of the power converter and the load circuit and the secondary coil. As the embodiment, the impedance matching circuit may cause resonance in the vicinity of 100 kHz which may enhance the power transfer.

The coil assembly may include at least one secondary coil and optically further include an element that shields a metal portion of the receiver from the magnetic field.

The communication unit may perform load modulation for communication of the request and other information to the power transmitter. To this end, the power receiver may switch a resistor and a capacitor so as to change reflection impedance.

The control unit may control reception power. To this end, the control unit may determine/calculate a difference between an actual operating point of the power receiver and a desired operating point. In addition, the control unit may adjust/reduce the difference between the actual operating point and the desired operating point by requesting adjustment of the reflection impedance of the power transmitter and/or adjustment of the operating point of the power transmitter. When the difference is minimized, optimal power reception may be performed.

The communication unit and the control unit may be provided as a separate element/chipset or may be provided as one element/chipset as illustrated in FIG. 2.

Meanwhile, although not shown in the figure, a Radio Frequency Identification (RFID)/Near Field Communication (NFC) reader unit (or an NFC function unit) for detecting the RFID/NFC cards may be further mounted on a power transmitter.

In the shared mode, the power transmitter needs to manage an exchange of information with one or more power receivers. To this end, the power transmitter provides a structure for communication with the power receiver and such a structure is the same as a communication frame described below.

In FIG. 7, the power transmitter provides a structure that provides a sequence of time slots in which each power receiver may transmit data packets. A sync pattern illustrated in FIG. 7 is provided between the respective slots. The sync pattern serves not only to separate the slots, but also to optimize the communication of the power receiver. In particular, the sync pattern may provide the receiver with information for collision resolution and guaranteed latency.

FIG. 7 illustrates a frame structure for data communication during power transfer. A shared mode protocol may use two types of frames, i.e., a slotted frame and a free-format frame. The slotted frame may be used for the power receiver to transmit short data packets to the power transmitter and the free-format frame may be used for other purposes such as bi-directional larger data packet transmission and coil selection in the multi-coil transmitter.

All frames start with the sync pattern and a measurement slot and the measurement slot may be used to measure the transmission power and the reception power. As the embodiment, 9 slots may be included in one slotted frame. For the free-format frame, there are no specific format restriction beyond the sync pattern and the measurement frame. A start bit (information) of a sync packet may indicate the start of the frame.

FIG. 8 is a diagram illustrating a sync packet according to an embodiment of the present invention.

As illustrated in FIG. 8, the sync packet may include at least one of a preamble, a start bit, a response field, a type field, an Info field, and a parity bit.

The preamble includes a sequence of bits set to one. The number of bits involved may vary depending on the operating frequency. The start bit may be set to zero. The parity bit is a last bit of the sync pattern, and may be set to 1 when the bits set to 1 included in the data fields included in the sync pattern are even and to 0 otherwise.

The response field may include a response of the transmitter to communication from the receiver in a preceding slot. 00 may indicate non-acknowledge regarding that the communication may not be detected, 01 may indicate not-acknowledge regarding that a communication error is detected, and 10 may indicate not-acknowledge regarding that the communication is correctly received, and 11 may indicate acknowledge regarding that the communication is correctly received.

The type field may be set to 1 for a first sync pattern included in the frame and may be set to 0 for other sync patterns.

The Info field has a different value and meaning according to the sync pattern indicated in the sync field. First, when the type field is 1, the info field may indicate whether the frame is the slotted frame or the free-format frame. In addition, when the type field is 0, the Info field may indicate whether a next slot is a slot allocated to a specific receiver, a slot temporarily provided to a specific receiver, or a free slot which may be used by any receiver.

FIG. 9 is a diagram illustrating a power transmission method in a shared mode.

In the shared mode, the power transfer method may include a selection phase, an introduction phase, a configuration phase, a negotiation phase, and a power transfer phase.

The selection phase may represent a selection phase in the inductive mode illustrated in FIG. 3 and in the shared mode, the selection phase may be omitted and the remaining four phases may be described. In the shared mode, if the presence of frequency shift keying (FSK) in the electric power signal is detected before the wake-up timeout, the process may proceed directly to the introduction phase.

In the introduction phase, the power receiver may request a free slot to transmit control information (CI) packets to use in the next phases. To this end, the receiver transmits an initial CI packet. When the power transmitter responds with the ACK, the power receiver may proceed to the configuration phase. When the power transmitter responds with the NAK, another receiver may perform the configuration phase or the negotiation phase. Therefore, the receiver may request the free slot again. When the receiver receives the ACK, the receiver may determine a private slot thereof in the frame and thereafter, transmit the CI packet b using the slot at the corresponding location.

In the configuration phase, the power transmitter may provide a series of locked slots for exclusive use of the power receiver. This is for the receiver to perform the configuration phase without a collision. The receiver may transmit two identification data packets (IDHI and IDLO), and optionally at least one proprietary data packets, and a configuration packet (CFG) using the locked slots. Upon completing such a phase, the receiver may proceed to the negotiation phase.

In the negotiation phase, the transmitter may also continuously provide the locked slots for exclusive use of the receiver. This is also for the receiver to perform the negotiation phase without the collision. The receiver uses the locked slots to transmit negotiation data packets (including a specific request (SRQ) and a general request (GRQ)) and at least one optional proprietary data packet. Then, the receiver may terminate the negotiation phase by transmitting an SRQ/en (SRQ/end-negotiation) packet. When such a phase is terminated, the transmitter proceeds to the power transfer phase and the transmitter stops providing the locked slots.

In the power transfer phase, the receiver transmits the CI packet using the allocated slot. The, the receiver receives the power. The power receiver may include a regulator circuit. The regulator circuit may be included in the communications and control unit. The receiver may self-regulate the reflection impedance of the receiver through the regulator circuit. That is, the receiver may adjust the reflection impedance so as to transfer the amount of power required for an external load and prevent reception of excessive power or overheat. In the shared mode, the transmitter may not adjust the power corresponding to the received CI packet according to the operation mode, so that it is possible to control preventing an over-voltage situation in this case.

Foreign Object Detection (FOD) Extensions

Hereinafter, FOD extension for detecting a foreign object that is not a wireless charging object in performing the power transmission/reception/control method in the inductive mode described above with reference to FIGS. 3 and 4 will be described. This FOD extension may be performed in such a manner that the negotiation phase, a calibration phase, and a renegotiation phase are added to a basic system control method, as illustrated in FIG. 10. The newly added phases may mainly perform a function for detecting the foreign object.

FIG. 10 is a diagram illustrating a method for controlling a wireless power transmission/reception system to which FOD extension is applied according to an embodiment of the present invention. The description of each phase described above with reference to FIGS. 3 and 4 may be applied in the same or similar manner and hereinafter, differences from FIGS. 3 and 4 will be mainly described, and duplicated description will be omitted.

Referring to FIG. 10, in the selection phase, the power transmitter may monitor an interface surface and monitor the placement and removal of objects using small measurement signals. This measurement signal should not wake up the power receiver located on the interface surface. When the power transmitter senses the foreign object on the interface surface, the power transmitter needs to remain in the selection phase and should not provide the electric power signal to prevent overheating of the foreign object.

In the negotiation phase, the power receiver may negotiate with the power transmitter to minutely adjust the power transfer contract. To this end, the power receiver may transmit a negotiation request to the power transmitter which the power transmitter may accept or reject. In addition, to improve a capability of an initial evaluation of the presence of the foreign object, the power transmitter may compare a quality factor reported by the power receiver with a measurement value (or signal) thereof. When the power transmitter detects the foreign object, the process needs to return to the selection phase.

In the calibration phase, the power transmitter may enhance a capability to detect the foreign object during power transmission. In particular, the power transmitter may adjust parameters of a power loss method. Here, the power receiver may provide the reception power thereof under two load conditions.

In the power transfer phase, the power transmitter may continually check whether a new foreign object is placed on the interface surface. To this end, the power transmitter may use an FOD power loss method based on, for example, a calibrated power loss calculation. The power receiver may also check the placement of the new foreign object. When the power transmitter or power receiver detects the foreign object, the power transmitter and/or the power receiver must reduce the electric power signal or remove the electric power signal and return to the selection phase.

In the renegotiation phase, the power transmitter may adjust the power transfer contract when desired. If necessary, the renegotiation phase may be terminated prematurely without changing the power transfer contract.

In the calibration phase, the power transmitter needs to receive from the power receiver information which the power transmitter will use to improve the power loss method for the FOD. In particular, the power transmitter needs to receive received power information from the power receiver and the power receiver at this time transmits the received power information at a light load (disconnected load) and a connected load. If the power transmitter does not receive such received power information, the power transmitter may remove the electric power signal and return to the selection phase. However, the power transmitter may attempt to improve the power loss method by using the received power information only when it is confirmed that there is no foreign object.

The operation of the power transmitter in the calibration phase may be the same as the operation in the power transfer phase, but the following operations may be added.

If the power transmitter receives a 24-bit received power packet with the mode field set to '001' (calibration mode for the light load) and if the received power value is met, the power transmitter may transmit an ACK response. Otherwise, the power transmitter may transmit an NAK response.

If the power transmitter receives a 24-bit received power packet with the mode field set to '010' (calibration mode for the connected load) and if the received power value is met, the power transmitter may transmit the ACK response and continuously perform the power transfer phase. Otherwise, the power transmitter may transmit the NAK response.

Here, the received power packet (RPP) may correspond to a packet transmitted to the power transmitter at least once by the power receiver in the negotiation phase in order to change the format of the received power packet determined in the power transfer contract. When the power transmitter transmits the ACK response to the received power packet, the format of the received power packet in a provisional power transfer contract may be changed based on the received power packet in which the ACK response is transmitted.

NFC/RFID Detection Method

When a Radio Frequency Identification (RFID) card or a Near Field Communication (NFC) card is placed between a power transmitter (e.g., wireless charger) and a power receiver (e.g., mobile device, etc.), a power transmitter without having RFID/NFC detection function cannot detect an RFID/NFC card. In addition, even with the FOD method defined by WPC, which is a standard for a wireless power transmission/reception system, the power transceiver cannot detect the RFID/NFC card. The reason is that the FOD method defined in the WPC is defined to detect foreign object based on how much power transmitted from the power transmitter to the power receiver is lost (e.g., if the transmission efficiency is below a pre-configured level), but in the case of an RFID/NFC card, even if it is placed between the power transmitter and the power receiver, power loss does not occur. Furthermore, since the operating frequency (e.g., about 100 to 205 kHz) of the electric power transceiver defined in the WPC is different from the operating frequency of the RFID/NFC card (e.g., about 13.56 MHz), even with the frequency it is difficult to detect the RFID/NFC card.

If the wireless power transceiver fails to detect the presence of the RFID/NFC card and maintains the power transmission, there exists the problem that the RFID/NFC card continuously exposed to a strong magnetic field may eventually be damaged and causes financial/property damage to a user. Furthermore, stability problems due to the heat generation of the RFID/NFC card can be raised.

Therefore, in the present specification, a method for detecting such an RFID/NFC card will be proposed. The description of the embodiments proposed herein can be cooperated with the WPC Qi wireless power transmission system power class 0 specification Version 1.2.3 and Version 1.3.

As one embodiment, since most of the power receivers (for example, mobile devices, smart phones, etc.) that are recently released have embedded NFC functions, the power receiver uses the function to detect RFID/NFC cards. Using this function, a power receiver that detects an RFID/NFC card can transfer the RFID/NFC detection information to the power transmitter, and the power transmitter can stop power transmission and guide the user to remove the RFID/NFC card.

In order to detect the RFID/NFC card using the NFC function built in the power receiver, the protocol promised in advance for the power transmission/reception period needs to be defined. In order to apply this to a wireless power system standardized by WPC, compatibility with a protocol/packet already defined in the WPC standard should be maintained. However, in the WPC standard up to now, the packet for transferring the RFID/NFC detection information from the power receiver to the power transmitter has not separately defined.

Accordingly, hereinafter, using an NFC function of a power receiver, a new protocol between a power transmitter and receiver for detecting an RFID/NFC card is defined, and the embodiment is proposed in which in various packets (e.g., a capability packet, an end power transfer (EPT) packet, a configuration packet, etc.) pre-defined in the WPC specification for the compatibility with the WPC specification, a new field/bit (e.g., RFID/NFC detection field/bit, etc.) is defined, and it is used for the protocol.

In the wireless power transmission and reception system, the NFC/RFID detection of the power receiver can proceed as follows.

1. If the power receiver is placed on a power transmitter (i.e., the power receiver is located in the charging area of the power transmitter), the power transmitter can detect the power receiver and wake up the power receiver using the digital ping.

2. The power receiver waken up enters the power transfer phase through various phases according to the power transfer method/protocol defined in the WPC specification (refer to FIGS. 3 and 10).

3. The power receiver entering the power transfer phase performs the RFID/NFC detection operation, and it is necessary to obtain time for performing the detection operation. Also, during the RFID/NFC detection of the power receiver, it is necessary to stop the power transfer operation of the power transmitter. The reason is that the magnetic field formed by the power transmitted from the power transmitter is an interference/disturbance for the power receiver to perform the NFC/RFID detection operation.

For this reason, the power receiver may transmit an EPT packet instructing the power transmitter to stop the power transmission for a certain amount of time (in this case, the value of the EPT packet can be set as 0x0C(=indicating re-ping)) (in the negotiation phase), and thus the power transmitter can restart from the digital ping transmission again after a certain amount of time. The certain amount of time for the power transmitter to stop the power transfer may be set using a re-ping time packet (which may be transmitted in the negotiation/renegotiation phase) (also referred to as a 're-ping' packet), which will be described below.

4. The power receiver can perform RFID/NFC detection by activating the embedded NFC function. If the power transmitter enters the power transfer phase (or charging mode) by retransmitting the digital ping during RFID/NFC detection of the power receiver, the power receiver can transmit an EPT packet (in this case, the value of the EPT packet may be set as 0x0C(=re-ping)) to the power transmitter again (in this case, the value of the EPT packet may be set to 0x0C(=re-ping)) to extend the detection time.

5. If the NFC/RFID card is detected, when the power receiver enters the power transfer mode (or the charging mode) (after the expiration of the certain amount of time), the power receiver can generate/transmit an EPT packet (NFC detection) including information indicating that the RFID/NFC card has been detected, thereby causing the power transmitter to stop transferring power. Upon receiving this EPT packet, the power transmitter can stop power transfer and induce/guide a user to remove the NFC/RFID card using a user interface.

6. If the NFC/RFID card is not detected, the power receiver deactivates the embedded NFC function (to prevent damage to the embedded NFC functionality due to the strong magnetic field created by the power transmitter during charging), and then the power transfer phase (or charging mode) can be continued.

That is, upon checking the above-mentioned RFID/NFC detection method, when the power receiver detects the NFC/RFID card using the embedded NFC function, the electric power signal provided from the power transmitter can act as an interference signal, it is necessary to temporarily stop transmission of the electric power signal. Thus, in order to obtain the necessary for RFID/NFC detection, the power receiver can transmit an EPT packet (indicating a re-ping) pre-defined in the WPC specification to ensure that the power transmitter has to stop transferring power for a certain amount of time. The power receiver may perform RFID/NFC detection for a period of time during which the power transfer is interrupted, and then transmit the detection result to the power transmitter through an EPT packet (including NFC/RFID detection information). Upon receiving the EPT packet (RFID/NFC detection) including the result that the RFID/NFC card is detected, the power transmitter can stop transmitting power, thereby guiding a user to remove the RFID/NFC card (using a user interface or the like).

In this manner, the power receiver can detect/protect the RFID/NFC card using the embedded NFC function. To support this operation, a new EPT value/code is defined so that NFC detection information can be displayed in the existing EPT packet.

FIG. 11 illustrates an EPT packet format defined in the current WPC standard.

The EPT packet may contain an EPT value/code defined as shown in Table 1 below.

TABLE 1

| Reason | Value | Recommended usage of the values (Informative) |
|---|---|---|
| Unknown | 0x00 | The Receiver may use this value if it does not have a specific reason for terminating the power transfer or if none of the other values listed in this table is appropriate |
| Charge Complete) | 0x01 | The Receiver should use this value if it determines that the battery of the Mobile Device is fully charged On receipt of an End Power Transfer Packet containing this value, the Transmitter should set any "charged" indication on its user interface that is associated with the Receiver |
| Internal Fault | 0x02 | The Receiver may use this value if it has encountered some internal problem (e.g. a software or logic error) |
| Over Temperature | 0x03 | The receiver should use this value if it has measured a temperature within the mobile device that exceeds a limit |

TABLE 1-continued

| Reason | Value | Recommended usage of the values (Informative) |
|---|---|---|
| Over Voltage | 0x04 | The Receiver should use this value if it has measured a voltage within the mobile device that exceeds a limit |
| Battery Failure | 0x06 | The Receiver should use this value if it has determined a problem exists with the Mobile Device battery |
| Reserved | 0x07 | The End Power Transfer Value = 0x07(reconfigure) has been deprecated and should not be used. It may result in unpredictable Power Transmitter behavior |
| No Response | 0x08 | The Receiver should use this value if it determines that the Transmitter does not respond to Control Error Packets as expected (e.g. it does not increase or decrease its Primary Cell current appropriately) |
| Reserved | 0x09 | — |
| Negotiation Failure (Extended Power Profile only) | 0x0A | A power receiver should use this value if it cannot negotiate a suitable Guaranteed power level |
| Restart Power Transfer (Extended Power Profile only) | 0x0B | A power receiver should use this value if sees a need for Foreign Object Detection with no power transfer in progress (see Section 11.3, FOD based on quality factor change). To enable such detection, the power transfer has to be terminated. Typically, the power transmitter then performs Foreign Object Detection before restarting the power transfer. |
| Reserved | 0x0C to 0xFF | — |

In other words, the EPT packet itself indicates complete/stop request in the power transfer, and in the EPT packet, as shown in Table 1, an EPT code/value indicating the reason why the power receiver requests the power transmitter to complete/stop power transfer can be transmitted to be carried.

Of these EPT values/codes, a specific code can be used/set as a value/code indicating the RFID/NFC detection result. For example, '0x0D', which is currently set as the reserved bit, can be set/used as a value/code indicating that the RFID/NFC is detected. In this case, a description of 0x0D may be added as shown in Table 1 below.

Reason: NFC/RFID detected, value: 0x0D, Recommended usage of the values (Informative): Power Receiver detected RFID/NFC card/tag in the proximity.

In this example, the power transmitter receiving the EPT packet indicated 0x0D stops power transfer/transmission and can notify the user that the RFID/NFC card/tag is present in the charging area to induce RFID/NFC card/tag removal in the charging area.

Also, 0x0C of the reserved bits may be used/set as an EPT value/code requesting to stop power transmission for a certain amount of time (for example, a re-ping time).

This EPT packet may be transmitted from the power receiver to the power transmitter at a specific phase of the WPC protocol (e.g., a ping phase or a negotiation phase).

In the above-described embodiment, the power receiver has been mainly described as an entity performing the RFID/NFC detection operation, but the present invention is not limited thereto, and the power transmitter may also function as an entity performing the RFID/NFC detection operation. However, in order to perform the RFID/NFC detection operation, the power transmitter also assumes an RFID/NFC reader unit (or an NFC functional unit) capable of detecting RFID/NFC (in proximity) to be embedded/mounted.

Hereinafter, an embodiment in which the power receiver and the power transmitter selectively function as an entity performing the RFID/NFC detection operation will be described.

In another embodiment, either the power transmitter or the power receiver can selectively perform the RFID/NFC detection operation depending on whether the power transmitter has RFID/NFC detection capability.

In order for the power receiver to determine whether to activate the NFC function embedded therein, the power receiver needs to know whether the power transmitter is capable of detecting the RFID/NFC. Accordingly, the power transmitter can inform whether or not it has RFID/NFC detection capability in the negotiation phase and whether the RFID/NFC has been detected if it has the detection capability to the power receiver through the capability packet.

If the power transmitter informs the power receiver (at the negotiation phase) that 'it has the capability of detecting RFID/NFC and has detected the RFID/NFC', the power receiver will guide a user to remove the RFID/NFC card (in proximity).

When the power transmitter informs the power receiver (at the negotiation phase) that there is no RFID/NFC detection capability, the power receiver can perform the RFID/NFC detection operation. In this case, the power receiver may transmit an EPT packet (0x0C(=re-ping) to remove/turn off the transmit electric power signal of the power transmitter, which may interfere/disturb with the RFID/NFC detection for a certain amount of time (e.g. re-ping time) to the power transmitter. The power receiver can be configured to: (1) fit into the WPC protocol (power transfer protocol/scheme defined in the WPC specification); and (2) detect the RFID/NFC card/tag, while the power transmitter stops power transmission to prevent interference/disturbance of the NFC function. The certain amount of time at which the power transmission is stopped may be defined as a re-ping time, and this re-ping time may be negotiated/indicated by the re-ping time packet. The example for the re-ping time packet format will be described below with reference to FIG. 23.

During transmission of the electric power signal is stopped, the power receiver can detect the RFID/NFC card/ tag in the proximity position using the embedded NFC function. A detailed description for the detection method is as described above.

When the power transmitter resumes the WPC protocol from the ping stage after a certain amount of time (e.g., re-ping time) has expired, if the power receiver has detected the RFID/NFC card in proximity for the certain amount of time (e.g., re-ping time), it may transmit an EPT packet (e.g., set to 0x0D) (e.g., a configuration packet, a specific request packet) indicating that an RFID/NFC has been detected to stop the WPC protocol to the power transmitter. Further, the power transmitter and/or power receiver may inform the user to remove the RFID/NFC card/tag in the proximity location. Otherwise, the power receiver can proceed to the WPC protocol and receive power from the power transmitter.

In order for the above-described embodiment to be compatible with the wireless power transmission/reception system defined in the WPC standard, it is necessary to define new fields/bits indicating whether the power transmitter has RFID/NFC detection capability and/or whether the RFID/NFC has been detected in a capability packet carrying capability information of the power transmitter. Various embodiments relating to the new format of this capability packet will be described later in detail in FIGS. 12 to 16. The bit/field names of each packet illustrated in the present specification may vary according to the embodiment, and it is obvious that if the functions are the same, they can be regarded as the same bit/field even if the names are different.

FIG. 12 illustrates a capability packet format according to a first embodiment of the present invention.

Referring to FIG. 12, the capability packet (0x31) includes various capability information related to the power transfer of the power transmitter. For example, the capability packet includes a power class bit/field (2 bits), a guaranteed power value bit/field (6 bits), a potential power value bit/field (6 bits), a Wireless Power Identifier (WIPID) bit/field (1 bit), Not Res Sens. bit/field (1 bit) and/or an NFC detection/protection bit/field (2 bits). Here, the NFC detection/protection bits/field may be configured using at least some of the reserved bits in the capability packet that are pre-defined in the WPC specification.

The power class bits/field indicates the power class of the wireless power transmission and reception system. This bit/field can be set to a value of '00' (indicating class 0).

The guaranteed power value bit/field indicates the maximum guaranteed power value included in the power transfer contract (PTC-GP) that the power transmitter can negotiate in the current ambient conditions. Here, the ambient conditions may include, for example, the temperature of the power transmitter, the amount of power obtained from a power source that the power transmitter shares with other power transmitters, and/or whether or not there is a foreign substance or friendly metal material or the like. The guaranteed power value bit/field indicates the power value in units of 0.5 W.

The potential power value bit/field indicates the maximum guaranteed power value included in the power transmission contract (PTC-GP) that the power transmitter can negotiate under ideal ambient conditions. This field also indicates the power value in units of 0.5 W.

The Not Res Sens. bit/field may be set to a different value for each design of an individual power transmitter. In general, this bit/field may be set to a value of '0' to indicate a power transmitter design capable of frequency control below 150 kHz with a power transfer contract that includes a maximum power value greater than 5 W.

The WPID bit/field indicates that the power transmitter is capable of receiving WPID packets.

The NFC detection/protection bit/field may indicate whether the power receiver has a capability of detecting RFID/NFC and/or whether an RFID/NFC card/tag has been detected. The NFC detection/protection bit/field may be composed of 2 bits size, and the bit indicated by each bit/field value can be illustrated as follows.

- 00b: The power transmitter has no capability of detecting RFID/NFC (card/tag).
- 01b: reserved bit/field
- 10b: The power transmitter has a capability of detecting RFID/NFC (card/tag), and RFID/NFC is not detected (in proximity location).
- 11b: The power transmitter has a capability of detecting RFID/NFC and RFID/NFC is detected (in proximity location).

The information indicated by each bit/field value is only an example, and the bit/field value indicating each information may be changed according to the embodiment.

The next operation of the power receiver receiving the NFC detection/protection bit/field value according to the above example is the same as the example of FIG. 13.

FIG. 13 is a table illustrating a next operation of a power receiver receiving an NFC detection/protection bit/field according to an embodiment of the present invention.

Referring to FIG. 13, when the power receiver receives an NFC detection/protection bit/field (indicating that the power transmitter has no capability of detecting RFID/NFC (card/tag)) set to a value of '00', it may transmit an EPT packet to perform the RFID/NFC detection to the power transmitter (this is to secure the RFID/NFC detection execution time and to remove the electric power signal which may interfere with the RFID/NFC detection, as described above). More specifically, in order to detect the RFID/NFC card/tag, the power receiver may transmit a re-ping time packet and/or an EPT (set to 0x0c (=re-ping)) packet to the power transmitter. Here, the re-ping time packet indicates a packet for setting a re-ping time (duration/period) at which the power transmitter stops transmitting the electric power signal, this re-ping time packet will be described in detail below with reference to FIG. 23 will be described later. The RFID/NFC detection operation of the power receiver below follows the NFC/RFID detection method of the power receiver described above.

When the power receiver receives an NFC detection/protection bit/field (reserved bit/field) set to a value of '01', it corresponds to a spare bit and the power receiver does not take any action or may transmit the EPT packet to remove an electric power signal.

If the power receiver has received an NFC detection/protection bit/field set to a value of '10' (indicating that the power transmitter has a capability of detecting RFID/NFC and the RFID/NFC has not been detected (in proximity location)), a calibration step may be proceeded to receive power from the power transmitter.

If the power receiver has received an NFC detection/protection bit/field set to a value of '11' (indicating that the power transmitter has a capability of RFID/NFC and that the RFID/NFC has been detected (in proximity location)), it may be notified a user to remove the NFC card/tag. Further, the power receiver and/or power transmitter may refrain from entering the power transfer phase until the detected RFID/NFC card/tag is removed.

FIG. 14 illustrates a capability packet format according to a second embodiment of the present invention.

Referring to FIG. 14, the capability packet 0x31 includes a power class bit/field (2 bits), a guaranteed power value bit/field (6 bits), a potential power value bit/field (6 bits), a WPID bit/field (1 bit), a Not Res Sens. bit/field (1 bit), an NFC Protection Present (NFCPP) bit/field (1 bit) and/or an NFC Detected (NFCD) bit/field (1 bit). Here, as a description for the power class bit/field, the guaranteed power value bit/field, the potential power value bit/field, the WPID bit/field, and the Not Res Sens bit/field (1 bit) has been described above with reference to FIG. 12, and thus redundant description will be omitted. The NFCPP bit/field and the NFCD bit/field may be configured using at least some of the reserved bits in the capability packet that are pre-defined in the WPC specification.

The NFCPP bit/field may indicate whether the power transmitter has a capability of detecting RFID/NFC. The NFCPP bit/field may be composed of 1 bit size, and the bit indicated by each bit/field value can be illustrated as follows.
  0: The power transmitter has no capability of detecting RFID/NFC (card/tag).
  1: The power transmitter has a capability of detecting RFID/NFC (card/tag).

The NFCD bit/field may indicate whether the power transmitter has detected an RFID/NFC (card/tag). The NFCD bit/field may be composed of 1-bit size, and the bit indicated by each bit/field value can be illustrated as follows.
  0: The power transmitter has not detected RFID/NFC (card/tag) (in proximity location).
  1: The power transmitter has detected RFID/NFC (card/tag) (in proximity location).

The information indicated by each bit/field value is only an example, and the bit/field value indicating each information may be changed according to the embodiment.

The next operation of the power receiver receiving the NFCPP and NFCD bit/field values according to the above example is the same as the example of FIG. 15.

FIG. 15 is a table illustrating the next operation of a power receiver that has received NFCPP and NFCD bits/fields according to an embodiment of the present invention.

Referring to FIG. 15, when the NFCPP and the NFCD bits/field (total 2 bits) are received with the capability packet set to a value of '00' (or '01'), the power receiver transmits an EPT packet to perform the RFID/NFC detection to the power transmitter (this is for the purpose of securing the RFID/NFC detection execution time and eliminating the electric power signal which may interfere/disturb with the RFID/NFC detection, as described above). More specifically, in order to detect the RFID/NFC card/tag, the power receiver may transmit a re-ping time packet and/or an EPT (set to 0x0c (=re-ping)) packet to the electric power. The RFID/NFC detection operation of the power receiver below follows the NFC/RFID detection method of the power receiver described above.

When the NFCPP and the NFCD bit/field are set to a value of '10'; and the capability packet is received, the power receiver may proceed with a calibration step to receive power from the power transmitter.

If the power receiver has received the capability packet with the NFCPP and the NFCD bit/field set to a value of '11', the power receiver may guide the user to remove the RFID/NFC card/tag. Further, the power receiver and/or power transmitter may refrain from entering the power transfer phase until the detected RFID/NFC card/tag is removed.

As described above, in order to determine whether the power transmitter has detected the RFID/NFC, the power receiver may transmit a general request packet requesting the capability packet including the NFCPP and/or NFCD bit/field, or it may transmit a specific request packet having a newly defined request code, and thus it may confirm whether the power transmitter has detected/capability of detecting the RFID/NFC. For example, the power receiver may transmit a specific request packet including a request field with a code/value of 0x05 to the power transmitter, and thus it may inquire to the power transmitter whether the RFID/NFC has been detected.

The power transmitter receiving the specific request packet may transmit
  ACK (or NACK (Negative Acknowledge)) response if it has not detected an RFID/NFC (card/tag)
  NACK (or ACK) response if it has detected the RFID/NFC (card/tag)
  ND (Not Defined) response if it has not known whether the RFID/NFC (card/tag) exists or not (for example, if the power transmitter does not understand a new request included in the specific request packet), respectively.

If the ND response has been received, in order to perform RFID/NFC detection, the power receiver may transmit an EPT packet to the power transmitter (this is for the purpose of securing the RFID/NFC detection execution time and eliminating the electric power signal which may interfere/disturb with the RFID/NFC detection, as described above). More specifically, in order to detect the RFID/NFC card/tag, the power receiver may transmit a re-ping time packet and/or an EPT (set to 0x0c (=re-ping)) packet to the electric power. The RFID/NFC detection operation of the power receiver below follows the NFC/RFID detection method of the power receiver described above.

If the ACK response has been received, the power receiver may proceed with a calibration step to receive power from the power transmitter.

If the NACK response has been received, the power receiver may guide a user to remove the RFID/NFC card/tag. Further, the power receiver and/or power transmitter may refrain from entering the power transfer phase until the detected RFID/NFC card/tag is removed.

FIG. 16 illustrates a capability packet format according to a third embodiment of the present invention.

Referring to FIG. 16, the capability packet 0x31 includes a power class bit/field (2 bits), a guaranteed power value bit/field (6 bits), a potential power value bit/field (6 bits), a WPID bit/field (1 bit) a Not Res Sens. bit/field (1 bit), and/or an NFC protection bit/field (1 bit). Here, as a description for the power class bit/field, the guaranteed power value bit/field, the potential power value bit/field, the WPID bit/field, and a Not Res Sens. bit/field (1 bit) has been described above with reference to 12, and thus redundant description will be omitted. The NFC protection bits/field may be configured using at least some of the reserved bits in the capability packet set in the WPC specification.

The NFC protection bit/field may indicate whether the power transmitter has a capability of detecting RFID/NFC detection and whether it has detected the RFID/NFC. The NFC protection bit/field may be composed of 1-bit size, and the contents indicated by each bit/field value can be illustrated as follows.
  0: The power transmitter has no capability of detecting RFID/NFC (card/tag)
  1: The power transmitter has a capability of detecting the RFID/NFC (card/tag) but has not detected the RFID/NFC (card/tag) (in proximate location).

When the power receiver receives an NFC protection bit/field set to a value of '0', in order to perform RFID/NFC detection, it can transmit an EPT packet to the power transmitter (this is for the purpose of securing the RFID/NFC detection execution time and eliminating the electric power signal which may interfere/disturb with the RFID/NFC detection, as described above). More specifically, in order to detect the RFID/NFC card/tag, the power receiver may transmit a re-ping time packet and/or an EPT (set to 0x0c (=re-ping)) packet to the power transmitter. The RFID/NFC detection operation of the power receiver below follows the NFC/RFID detection method of the power receiver described above.

If the power receiver has received an NFC protection bit/field set to a value of '1', it may proceed with a calibration step to receive power from the power transmitter.

Hereinafter, a more specific embodiment in which the power transmitter and/or power receiver detects the RFID/NFC (card/tag) will be described with reference to the respective drawings.

FIG. 17 illustrates an RFID/NFC detection method of a power receiver according to the first embodiment of the present invention. In particular, FIG. 17 (a) illustrates the operation/phase of the power receiver without the RFID/NFC detection function and FIG. 17 (b) illustrates the RFID/NFC detection operation/step of the power receiver with RFID/NFC detection function. In the figure, the horizontal axis represents the time and the vertical axis represents the amount of power.

Referring to FIG. 17 (a), a power receiver without RFID/NFC detection function can receive power according to a general WPC protocol. The description of a ping phase (analog ping and digital ping transmission), an identification/configuration phase, a negotiation phase, a calibration phase and a power transfer phase defined in the WPC protocol is as described above in FIGS. 3, 9 and 10. In this embodiment, instead of the power receiver without the RFID/NFC detection function, the power transmitter with the RFID/NFC detection function can perform the RFID/NFC detection operation.

Referring to FIG. 17 (b), a power receiver with RFID/NFC detection capability may transmit an EPT packet (set to as 0x0C or indicating the re-ping) to stop the power transfer of the power transmitter during the re-ping time, in the negotiation phase (or after the negotiation phase). The power transmitter receiving the EPT packet (set to as 0x0C or indicating the re-ping) may stop transmitting power with the power receiver during the negotiated re-ping time in the negotiation phase. In addition, the power receiver can activate the embedded NFC function during the re-ping time and thus performing the RFID/NFC detection operation (in proximate location).

When the re-ping time expires, the power transmitter may transmit a digital ping to wake up the power receiver to resume the WPC protocol for power transfer.

If the RFID/NFC (card/tag) has not been detected during the re-ping time, the power receiver may proceed with the general WPC protocol sequentially to receive power from the power transmission.

If an RFID/NFC (card/tag) has been detected during the re-ping time, the power receiver can inform the power transmitter of the detection result. More specifically, in order to prevent damage to the detected RFID/NFC (card/tag), the power receiver can inform the RFID/NFC (card/tag) detection result such that the power transmitter stops power transfer. The power receiver can transmit the RFID/NFC detection result to the power transmitter through a 'configuration packet' transmitted/received in the identification/configuration phase or a 'specific request packet' transmitted/received in the negotiation step. Examples of such configuration packets and specific request packet formats are described below in detail below with respect to FIGS. 24 and 25.

Upon receiving the detection result that the RFID/NFC (card/tag) has been detected from the power receiver, the power transmitter can remove the electric power signal that is being transmitted.

FIG. 18 is a flowchart showing the embodiment of FIG. 17 in terms of operation of a power transmitter and a power receiver.

Referring to FIG. 18, the power receiver may transmit a General Request (GR) packet (0x31) to the power transmitter in the negotiation phase (or after the negotiation phase) (S18010). The general request packet may include information requested by the power receiver. In the case of the present embodiment, in order to determine whether the power transmitter is equipped with the RFID/NFC detection capability, the power receiver may request capability information/packets for the RFID/NFC detection capability of the power transmitter through a general request packet.

Next, as a response to the general request packet, the power transmitter may transmit a capability packet including its RFID/NFC detection capability information to the power receiver (S18020). The format of the capability packet may follow the embodiment described above in FIGS. 12, 14 and 16, and the operation of the power receiver according to the received capability packet information may follow the embodiment described above in FIGS. 13, 15 and 16. In this flowchart, it is described in the assumption that the capability packet format follows the embodiment of FIG. 16 and that the power transmitter does not have capability of detecting the RFID/NFC. Thus, in order to indicate that it is not equipped with RFID/NFC detection capability, the power transmitter may set the NFC protection bit/field in the capability packet to a value of '0' (or '0'b) and transmit it to the power receiver.

Next, in order to secure time to perform the RFID/NFC detection operation, the power receiver may transmit a re-ping time packet and/or an EPT packet to the power transmitter, to instruct the power transmitter to stop the power transmission (S18030). In principle, the re-ping time packet is used to set the re-ping time, and the EPT packet is used to stop the power transmission of the power transmitter, respectively. However, in order to reduce the time/signaling overhead, a new re-ping time packet format may be defined that sets a re-ping time and requests a power transmission interruption during a re-ping time, and it will be described for this format in detail below. In this flowchart, the 'Immed' bit/field value in the re-ping time packet is set to '1', and It is assumed that this re-ping time packet indicates the re-ping time, and at the same time, the packet is functioned as a packet requesting the power transmission interruption.

Next, the power receiver can perform the RFID/NFC detection operation using the embedded NFC function during the re-ping time (S18040). Once the set re-ping time expires, the power transmitter and power receiver may perform the ping phase and the identification/configuration phase.

Next, the power receiver can report the RFID/NFC detection result to the power transmitter via the configuration packet or the specific request packet. The embodiment for a configuration packet or a specific request packet format will be described below with reference to FIGS. 24 and 25 below.

If the power receiver has detected an RFID/NFC (card/tag), the power transmitter can transmit the configuration packet or specific request packet including the detection result during or after the identification/configuration phase) such that the electric power can remove the electric power signal (or stop the power transmission) (S18050). As will be described later, the NFC protection bit/field value in the configuration packet transmitted in this case may be set to '1'b, and the request bit/field value in the specific request packet may be set to '0x05'. Upon receiving the configuration packet or the specific request packet, the power transmitter can immediately remove the electric power signal (or stop the power transfer) and guide a user to remove the detected RFID/NFC (card/tag).

FIG. 19 illustrates an RFID/NFC detection method of a power receiver according to a second embodiment of the present invention. In particular, FIG. 19 (a) illustrates the operation/phase of the power receiver without the RFID/NFC detection function and FIG. 19 (b) illustrates the operation/phase of the power receiver with the RFID/NFC detection function. The description of this embodiment can be applied in the same/similar manner for the description of the first embodiment described above with reference to FIG. 17, and the following description will focus on differences from the first embodiment. In the figure, the horizontal axis represents the time and the vertical axis represents the amount of power.

In the case of the second embodiment, unlike the first embodiment, there is a difference in that the electric power signal interruption time is before the calibration step (or during the negotiation step) (for in the first embodiment, it is during or after the identification/configuration phase). The difference for this point in time is resulted from that (1) the point in time at which the power level started to be transmitted to the power receiver starts from the calibration step, and (2) the information that the RFID/NFC (card/tag) has been detected is transmitted to the power transmitter through the EPT packet (set to 0x0D), which will be described later in detail with reference to the flowchart of FIG. 20.

FIG. 20 is a flowchart showing the embodiment of FIG. 19 in terms of operation of a power transmitter and a power receiver. The description of this flowchart may be applied in the same/similar manner for the description of the first embodiment described above with reference to FIG. 18, and the following description will focus on differences from the first embodiment.

Referring to FIG. 20, in order to confirm the RFID/NFC detection capability of the power transmitter in the negotiation step, the power receiver may transmit a general request (GR) packet (0x31) (S20010).

Next, as a response to the general request packet, the power transmitter may transmit the capability packet including its RFID/NFC detection capability information to the power receiver (S20020). In this flowchart, it is described in the assumption that the capability packet format follows the embodiment of FIG. 16 and that the power transmitter does not have capability of detecting the RFID/NFC. Thus, in order to indicate that it is not equipped with RFID/NFC detection capability, the power transmitter may set the NFC protection bit/field in the capability packet to a value of '0' (or '0'b) and transmit it to the power receiver Next, in order to secure time to perform the RFID/NFC detection operation, the power transmitter transmits a re-ping time packet and/or an EPT packet (set to as 0x0C or indicating the re-ping) to instruct the power transmitter to stop the power transmission (S20030). The Re-ping time packet format may follow the embodiment of FIG. 23, and the EPT packet format may follow the embodiment of FIG. 11. This phase may be performed before the calibration phase (e.g., in the negotiation phase) and this is for the power receiver to secure enough time to detect the RFID/NFC (card/tag) in advance, before the calibration phase where a magnetic field is strong enough to damage the RFID/NFC (card/tag).

Next, the power receiver may perform the RFID/NFC detection operation using the embedded NFC function during the re-ping time (S20040). Once the set re-ping time expires, the power transmitter and power receiver may perform the ping phase, the identification/configuration phase, and the negotiation phase.

Next, when the power receiver has detected the RFID/NFC (card/tag), the EPT packet (set to as 0x0D) (or configuration packet) including the detection result is transmitted to the power transmitter (during negotiation phase or identification/configuration phase), and thus allowing the power transmitter to remove the electric power signal (or stop power transfer) (S20050). Upon receiving the EPT packet (set to as 0x0D), the power transmitter may refrain from entering the calibration phase and remove the electric power signal (or stop power transfer). Furthermore, the power transmitter can guide a user to remove the detected RFID/NFC (card/tag).

FIG. 21 illustrates an RFID/NFC detection method of a power receiver according to a third embodiment of the present invention. In particular, FIG. 21(a) illustrates the operation/phase of a power receiver without the RFID/NFC detection function, and FIG. 21(b) illustrates the operation/phase of a power receiver with the RFID/NFC detection function. The description of this embodiment can be applied in the same/similar manner, compared with description of the first embodiment described above with reference to FIG. 17, and the following description will focus on differences from the first embodiment. In the figure, the horizontal axis represents the time and the vertical axis represents the amount of power.

In the case of the third embodiment, unlike the first embodiment, there is a difference in that the time of stopping electric power signal is during the ping phase (for in the first embodiment, it is during or after the identification/configuration phase).

FIG. 22 is a flowchart showing the embodiment of FIG. 21 in terms of operation of a power transmitter and a power receiver. The description of this flowchart can be applied in the same/similar manner, compared with the first embodiment described above with reference to FIG. 18, and the following description will focus on differences from the first embodiment.

Referring to FIG. 22, in order to confirm the RFID/NFC detection capability of the power transmitter in the negotiation step, the power receiver may transmit a general request (GR) packet (0x31) (S22010).

Next, to confirm the RFID/NFC detection capability of the power transmitter in the negotiation step, the power transmitter may transmit a capability packet including its own RFID/NFC detection capability information to the power receiver (S22020). In this flowchart, it is described in the assumption that the capability packet format follows the embodiment of FIG. 16 and that the power transmitter does not have the RFID/NFC detection capability. Thus, in order to indicate that the RFID/NFC detection capability is not equipped with, the power transmitter may set the NFC protection bit/field in the capability packet to a value of '0' (or '0'b) and transmit it to the power receiver.

Next, in order to secure time to perform the RFID/NFC detection operation, the power transmitter transmits a re-ping time packet and/or an EPT packet (which is set to as 0x0C or indicating the re-ping) to instruct the power transmitter to stop the power transmission. (S22030). The re-ping time packet format may follow the embodiment of FIG. 23, and the EPT packet format may follow the embodiment of FIG. 11. This step may be performed before the calibration phase (e.g., the negotiation phase), which may be performed before the RFID/NFC (card/tag) calibration phase, before the calibration step where the magnetic field is strong enough to damage the RFID/Tag) in order to ensure that the power receiver has enough time to detect it. This phase may be performed before the calibration phase (e.g., in the negotiation phase) and this is for the power receiver to secure enough time to detect the RFID/NFC (card/tag) in advance, before the calibration phase where a magnetic field is strong enough to damage the RFID/NFC (card/tag).

Next, the power receiver can perform the RFID/NFC detection operation using the embedded NFC function during the re-ping time (S22040). Once the set re-ping time expires, the power transmitter and power receiver can perform the ping step.

Next, when the power receiver detects the RFID/NFC (card/tag), it transmits an EPT packet (set to 0x0D) including the detection result (during the ping phase or at the start of the ping phase) to the power transmitter, and thus allowing the power transmitter to remove the electric power signal (or stop power transfer) (S22050). The power transmitter receiving the EPT packet (set to 0x0D) may remove the electric power signal (or stop power transfer). Furthermore, the power transmitter can guide a user to remove the detected RFID/NFC (card/tag).

As shown in the flowchart, in order to determine whether the power transmitter detects the RFID/NFC, the power receiver may transmit a general request packet requesting the capability packet, but it may transmit a specific request packet having a newly defined request code, and thus it may confirm whether the power transmitter has detected the RFID/NFC. For example, the power receiver may transmit a specific request packet including a request field with a code/value of 0x05 to the power transmitter, and thus may inquire to the power transmitter whether the RFID/NFC has been detected.

The power transmitter receiving the specific request packet may transmit:
ACK (or NACK (Negative Acknowledge)) response if has detected an RFID/NFC (card/tag)
NACK (or ACK) response if it has detected the RFID/NFC (card/tag)
ND (Not Defined) response if it has not known whether the RFID/NFC (card/tag) exists or not (for example, if the power transmitter does not understand a new request included in the specific request packet), respectively.

The power receiver can determine whether the RFID/NFC is detected based on the response sent from the power transmitter.

The power receiver may confirm whether the RFID/NFC has been detected based on a response transmitted from the power transmitter.

FIG. 23 illustrates a re-ping time packet format according to an embodiment of the present invention.

As described above, in order to perform the RFID/NFC detection operation, the power receiver may cause the power transmitter to immediately stop transmitting power and perform the ping phase again after the re-ping time defined in the re-ping time packet (i.e. return to the ping phase). To this end, a new type of re-ping time packet may be defined.

The re-ping time packet may have the bit size of 0x0A and may include a re-ping time bit/field and/or an Immed bit/field. Here, the Immed bit/field may optionally be included in the re-ping time packet according to the embodiment.

The Re-ping time bit/field may be composed of 6 bits size and may indicate Tre-ping as an unsigned integer value. Here, the Tre-ping corresponds to the value of a re-ping time multiplied by 0.2 seconds. That is, the power transmitter may divide the Tre-ping obtained through the re-ping time bit/field by 0.2 and then obtain the re-ping time to be actually applied to. The range of the Tre-ping may be limited to between 0.2 sec and 12.6 sec.

The Immed bit/field can be composed of 1-bit size, indicating the power interruption time of the power transmitter, and the contents indicated by each bit/field value can be illustrated as follows.
1 (or '1'b): immediately remove the electric power signal and indicate to re-perform/regress the ping phase after the re-ping time (or the Tre-ping time) (i.e., restart the WPC protocol).
0 (or '0'b): Upon receiving an EPT packet (set to 0x0C or indicating the re-ping) from the power receiver, it removes the electric power signal and instructs to re-perform/regress the ping phase after the re-ping time (or the Tre-ping time) (i.e., restart the WPC protocol).

FIG. 24 illustrates a configuration packet format according to an embodiment of the present invention.

Referring to FIG. 24, the configuration packet (0x51) includes various configuration information related to the power reception of the power receiver. For example, the configuration packet may include a power class bit/field (2 bits), a maximum power value bit/field (6 bits), a Prop bit/field (1 bit), a Count bit/field (5 bits), a window offset bit/field (3 bits), a Neg bit/field (1 bit), a polarity bit/field (1 bit), a Depth bit/field (2 bits) and/or an NFC bit/field (1 bit).

The power class bits/field indicates the power class of the wireless power transmission/reception system. This bit/field can be set to a value of '00' (indicating class 0).

The maximum power value bit/field may indicate different information depending on whether the power receiver supports the FOD extension function. If the power receiver does not support the FOD extension function, this bit/field may indicate the maximum amount of power that the power receiver expects to receive from the output of the power transmitter/rectifier. If the power receiver supports the FOD extension function, this bit/field may indicate the scaling factor of the received power value reported as the received power packet by the power receiver. In this case, the power receiver may set this bit/field to a value twice the maximum power (watt) that it expects to receive.

The Prop bit/field may indicate the power transmission control scheme of the power transmitter.

If the Neg bit/field is set to '0', this may indicate that the power transmitter does not transmit any response. If this bit/field is set to '1', this may indicate that the power transmitter should transmit an ACK (Acknowledge) response after the configuration packet indicating to the power receiver that it will enter the negotiation phase.

If the polarity bit/field is set to '0', this may indicate that the power transmitter should use the default FSK polarity. If this bit/field is set to '1', this may indicate that the power transmitter should use the reversed FSK polarity.

The depth bit/field may indicate the FSK modulation depth.

The Count bit/field may indicate the number of optional configuration packets transmitted by the power receiver in the identification/configuration phase.

The window size bits/field can indicate the window size averaged the reception power in units of 4 ms.

The window offset bit/field may indicate the time interval between the window for averaging the reception power and transmission of the reception power packet in units of 4 ms.

The NFC bit/field may indicate whether the NFC has been detected by the power receiver. For example, when this bit/field is set to '1'b, it indicates that the NFC/RFID (card/tag) has been detected by the power receiver. Thus, the power transmitter receiving this bit/field should remove the electric power signal. On the other hand, when this bit/field is set to '0'b, it indicates that the NFC/RFID (card/tag) has not been detected by the power receiver. Thus, the power transmitter receiving this bit/field may continue the WPC protocol without removing the electric power signal.

The information indicated by each bit/field value is only an example, and the bit/field value indicating each information may be changed according to the embodiment.

FIG. 25 illustrates a specific request packet format according to an embodiment of the present invention. More specifically, FIG. 25 (*a*) illustrates a specific request packet format, and FIG. 25 (*b*) illustrates request field values included in the specific request packet.

Referring to FIG. 25 (*a*), a specific request packet (0x20) may mainly include a request field and a request parameter field. The request field may include information requested by the power receiver to the power transmitter, and the request parameter field may include a parameter of the request.

Referring to FIG. 25 (*b*), the request fields 0x00 to 0x04 and 0xF0 to 0xFF are set to indicate request information requesting for the power transmitters, respectively, and at least one value of 0x05 to 0xEF remained as a reserved bit is set to power and may be used to indicate whether the receiver has detected the RFID/NFC (card/tag). For example, the request field set to 0x05 indicates that the power receiver has detected the RFID/NFC (card/tag). Thus, the power transmitter receiving this bit/field should remove the electric power signal.

FIG. 26 is a flowchart illustrating a power transfer method of a power transmitter according to an embodiment of the present invention. With respect to this flow chart, the embodiments and descriptions of FIGS. 11 to 25 described above can be applied in the same/similar manner, and the redundant description will be omitted.

First, the power transmitter may perform a selection step that monitors the placement and removal of an object to the interface surface of the power transmitter (S2610).

Next, the power transmitter may perform a ping step of performing digital ping and receiving a response from the power receiver (S2620).

Next, the power transmitter may receive the configuration packet including the configuration information of the power receiver (S2630). The configuration packet format may follow the embodiment of FIG. 24.

Next, a negotiation step of transmitting a capability packet including information on a power level transmitted from the power transmitter may be performed (S2640). The capability packet may be transmitted in response to a general request field transmitted from the power receiver. The capability packet may include an NFC detection field indicating whether the power transmitter has a capability of detecting the RFID and/or the NFC, and/or whether the RFID and/or the NFC has been detected. The NFC detection field includes a first subfield (e.g., NFCPP bit/field) indicating whether the power transmitter has a capability of detecting the RFID and/or the NFC and a second subfield (e.g., NFCD bit/field) indicating whether the RFID and/or the NFC is detected. In addition, various embodiments for the NFC detection field format are as described above in FIG. 12-16.

If the NFC detection field indicates that the power transmitter has no capability of detecting the RFID and/or the NFC, the power transmitter may receive a first EPT packet indicating a power transfer termination from the power receiver (S2650). The first EPT packet may include a first EPT code (e.g., 0x0C) requesting a removal of a power signal for a pre-configured time. The power receiver may perform the detection operation for the RFID and/or the NFC during the pre-configured time, and the power transmitter may return to the ping step (S2620) after removing the power signal for a pre-configured time (S2660). The power signal is removed for a pre-configured time because the electric power signal transmitted by the power transmitter may act as interference/disturbance with the detection operation by the RFID and/or the NFC of the power receiver.

The pre-configured time may be indicated through a specific packet (e.g., a re-ping time packet) transmitted from the power receiver in the negotiation step (S2640). The packet can indicate the predefined time in units of 0.2 second. The packet may include an Immed (Immediate) field indicating the time at which the power transmitter removes the power signal. The Immed field may instruct the power transmitter to immediately remove the power signal or to remove the power signal when the power transmitter receives the first EPT packet. An embodiment for such a packet format is as described above in FIG. 23.

When the digital ping is performed according to the return to the ping step (S2610), the power transmitter may receive the second EPT packet from the power receiver. In this case, the second EPT packet may include a second EPT code requesting a removal of the power signal as the RFID and/or the NFC is detected by the power receiver for a pre-configured time. The power transmitter receiving the second EPT packet may remove the power signal and provide the RFID and/or the NFC detection results to a user.

Although not shown in this flow chart, if the NFC detection field indicates that the power transmitter has a capability of detecting the RFID and/or the NFC and the RFID and/or NFC is not detected, in order to improve capability of detecting a foreign object during a power transfer of the power transmitter, a calibration step may be performed to adjust specific parameters.

Or, if the NFC detection field indicates that the power transmitter has a capability of detecting the RFID and/or the NFC, and that the RFID and/or the NFC is detected, it may not enter the calibration step. In this case, the power transmitter may remove the power signal and provide the RFID and/or the NFC detection results to a user.

Although the drawings have been described for the sake of convenience of explanation, it is also possible to design a new embodiment to be implemented by merging the embodiments described in each drawing. Further, configurations and methods of the described embodiments may not be limitedly applied to the aforementioned present invention, but all or some of the respective embodiments may be selectively combined and configured so as to be variously modified.

Further, while the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

Meanwhile, in the present specification, A and/or B can be interpreted to mean at least one of A and B.

INDUSTRIAL APPLICABILITY

The present invention can be applied to various wireless charging techniques.

The invention claimed is:

1. A method for transferring wireless power by a power transmitter, the method comprises:
 a ping step of performing a digital ping and receiving a response from a power receiver;
 an identifying/configuring step of receiving a configuration packet including configuration information of the power receiver; and
 a negotiating step of transmitting a capability packet including information on a level of power transferred by the power transmitter,
 wherein the capability packet include an NFC detection field indicating whether the power transmitter has a capability of detecting a Radio-Frequency Identification (RFID) and/or a Near Field Communication (NFC), and/or whether the RFID and/or the NFC is detected, and
 when the NFC detection field indicates that the power transmitter does not have the capability of detecting the RFID and/or the NFC:
  receiving a first End Power Transfer (EPT) packet for indicating a termination of a power transfer from the power receiver;
  wherein the first EPT packet includes a first EPT code requesting a removal of a power signal for a pre-configured time,
  removing the power signal for the pre-configured time, and returning to the ping step.

2. The method of claim 1, wherein the NFC detection field is divided into:
 a first subfield indicating whether the power transmitter has the capability of detecting the RFID and/or the NFC, and a second subfield indicating whether the RFID and/or the NFC is detected.

3. The method of claim 2,
 further comprising a step of receiving a second EPT packet from the power receiver, when re-performing the digital ping according to the returning to the ping step,
 wherein the second EPT packet includes a second EPT code requesting the removal of the power signal as the RFID and/or the NFC is detected by the power receiver for the pre-configured time.

4. The method of claim 3, further comprising a step of:
 when the second EPT packet is received, removing the power signal, and providing a detection result of the RFID and/or the NFC to a user.

5. The method of claim 2, further comprising:
 a calibration step of adjusting a specific parameter to improve a foreign object detection capability during the power transfer of the power transmitter, when the NFC detection field indicates that the power transmitter has the capability of detecting the RFID and/or the NFC, and the RFID and/or the NFC is not detected, and
 a step of not entering the calibration step, when the NFC detection field indicates that the power transmitter has the capability of detecting the RFID and/or the NFC, and the RFID and/or NFC is detected.

6. The method of claim 5,
 wherein the step of not entering the calibration step further comprising the step of:
 removing the power signal and providing a detection result of the RFID and/or the NFC detection to a user.

7. The method of claim 1,
 wherein the pre-configured time is indicated via a packet transmitted from the power receiver in the negotiating step.

8. The method of claim 7,
 wherein the packet includes a field indicating time at which the power transmitter removes the power signal.

9. The method of claim 8,
 wherein the field indicates the power transmitter to immediately remove the power signal or to remove the power signal when the power transmitter receives the first EPT packet.

10. The method of claim 7,
 wherein the packet indicates the pre-configured time in units of 0.2 seconds.

11. The method of claim 1,
 wherein the capability packet is transmitted as a response to a general request field transmitted from the power receiver.

12. A power transmitter, comprising:
 a coil assembly comprising at least one primary coil to generate a magnetic field;
 and
 a communication and control unit configured to control a communication with a power receiver and a power transfer,
 wherein the communication and control unit is further configured to:
 monitor a placement or a removal of an object on or from an interface surface of the power transmitter;
 perform a digital ping and receive a response from the power receiver;
 receive a configuration packet including configuration information of the power receiver; and
 transmit a capability packet including information on a level of power transferred by the power transmitter,
 wherein the capability packet includes an NFC detection field indicating whether the power transmitter has a capability of detecting a Radio-Frequency Identification (RFID) and/or a Near Field Communication (NFC), and/or whether the RFID and/or the NFC is detected, and
 when the NFC detection field indicates to the power transmitter that there is no ability to detect the RFID and/or the NFC:
  receive a first End Power Transfer (EPT) packet for indicating a termination of the power transfer from the power receiver;
  wherein the first EPT packet includes a first EPT code requesting a removal of a power signal for a pre-configured time,
  remove the power signal for the pre-configured time, and re-performing the digital ping.

13. The power transmitter of claim 12, wherein the NFC detection field is divided into:
 a first subfield indicating whether the power transmitter has the capability of detecting the RFID and/or the NFC, and a second subfield indicating whether the RFID and/or the NFC is detected.

14. A power receiver, comprising:
a coil assembly including at least one secondary coil to receive power from a primary coil of a power transmitter;
an NFC functional unit configured to detect Radio Frequency Identification (RFID) and/or Near Field Communication (NFC); and
a communication and control unit configured to control a communication with the power transmitter and a power transfer;
wherein the communication and control unit further configured to:
transmit a response for a digital ping of the power transmitter;
transmit a configuration packet including configuration information of the power receiver; and
receive a capability packet including information on a level of power transferred by the power transmitter,
wherein the capability packet includes an NFC detection field indicating whether the power transmitter has a capability of detecting a Radio-Frequency Identification (RFID) and/or a Near Field Communication (NFC), and/or whether the RFID and/or the NFC is detected, and
when the NFC detection field indicates to the power transmitter that there is no ability to detect the RFID and/or the NFC:
transmit a first End Power Transfer (EPT) packet for indicating a termination of a power transfer from the power receiver;
wherein the first EPT packet includes a first EPT code requesting a removal of a power signal for a pre-configured time,
detect the RFID and/or the NFC using the NFC functional unit for the pre-configured time.

15. The power receiver of claim 14, wherein the NFC detection field is divided into:
a first subfield indicating whether the electric power transmitter has the capability of detecting the RFID and/or the NFC, and a second subfield indicating whether the RFID and/or the NFC is detected.

* * * * *